(12) United States Patent
Moeller et al.

(10) Patent No.: US 12,710,752 B2
(45) Date of Patent: Aug. 18, 2026

(54) MODULATING OPERATOR INPUT FOR WORK ELEMENT ACTUATOR OPERATION

(71) Applicant: Doosan Bobcat North America, Inc., West Fargo, ND (US)

(72) Inventors: Casey Moeller, Bismarck, ND (US); Chad Swenson, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 818 days.

(21) Appl. No.: 17/747,648

(22) Filed: May 18, 2022

(65) Prior Publication Data

US 2022/0374011 A1 Nov. 24, 2022

Related U.S. Application Data

(60) Provisional application No. 63/189,884, filed on May 18, 2021.

(51) Int. Cl.

*G05D 1/00* (2024.01)
*E02F 9/20* (2006.01)
*E02F 9/22* (2006.01)

(52) U.S. Cl.

CPC ......... *G05D 1/0077* (2013.01); *E02F 9/2004* (2013.01); *E02F 9/2095* (2013.01); *E02F 9/2207* (2013.01)

(58) Field of Classification Search

CPC .... G05D 1/0077; E02F 9/2004; E02F 9/2095; E02F 9/2207; E02F 3/431; E02F 9/2058; E02F 3/3414

See application file for complete search history.

(56) References Cited

U.S. PATENT DOCUMENTS 5,021,917 A * 6/1991 Pike ...................... B66F 11/046 182/2.11
5,617,034 A 4/1997 Lark et al.
5,832,730 A * 11/1998 Mizui .................. E02F 9/2207 91/361
6,098,322 A 8/2000 Tozawa et al.
6,553,278 B2 4/2003 Handroos et al.
6,968,241 B2 11/2005 Vonnoe et al.

(Continued)

FOREIGN PATENT DOCUMENTS

JP H08253950 * 10/1996
JP 2009167673 A 7/2009

(Continued)

OTHER PUBLICATIONS

English translation of Sakamoto et al. (JP H08253950 (Year: 1996).*

(Continued)

*Primary Examiner* — Kyle J Kingsland
(74) *Attorney, Agent, or Firm* — Quarles & Brady LLP

(57) ABSTRACT

A control system for controlling movement of a work element of a power machine can include a control device, and an operator input device in communication with the control device. The control device can be configured to receive, from the operator input device, a signal for controlling an actuator of the work element. The signal can be filtered, using a digital notch filter, to generate a filtered signal, and an actuator of the work element can be controlled based on the filtered signal.

23 Claims, 15 Drawing Sheets

(56) References Cited

U.S. PATENT DOCUMENTS

| | | | | |
|---|---|---|---|---|
| 8,005,598 | B2 | 8/2011 | Terashima et al. | |
| 9,739,038 | B2 | 8/2017 | Baba et al. | |
| 10,519,630 | B2 | 12/2019 | Kanemitsu | |
| 2002/0173900 | A1* | 11/2002 | Vonnoe | E02F 3/433 701/108 |
| 2005/0207897 | A1 | 9/2005 | Kim | |
| 2013/0282205 | A1* | 10/2013 | Bailly | G05D 1/0858 701/3 |
| 2016/0251836 | A1* | 9/2016 | Baba | E02F 9/265 701/50 |
| 2020/0232186 | A1 | 7/2020 | Nakano et al. | |
| 2022/0300025 | A1* | 9/2022 | Katoh | G05G 5/02 |

FOREIGN PATENT DOCUMENTS

| | | | |
|---|---|---|---|
| JP | 4586225 | B2 | 11/2010 |
| JP | 4622683 | B2 | 2/2011 |
| WO | 20150155878 | A1 | 10/2015 |

OTHER PUBLICATIONS

International Searching Authority. International Search Report and Written Opinion for counterpart application PCT/US2022/029845. Mailed on Oct. 7, 2022 (12 pgs.).

* cited by examiner

MODULATING OPERATOR INPUT FOR WORK ELEMENT ACTUATOR OPERATION

CROSS-REFERENCE TO RELATED APPLICATIONS

The application claims priority to U.S. provisional patent application No. 63/189,884, titled "Modulating Operator Input for Work Element Actuator Operation" and filed May 18, 2021, the entirety of which is incorporated herein by reference.

BACKGROUND

This disclosure is directed toward power machines. More particularly, the present disclosure is directed to processing operator input signals for control of work elements of power machines. Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional power machines can include operator input devices that can be manipulated (e.g., by a human operator) to instruct a work element of the power machine to move accordingly (e.g., to shake a bucket of the power machine). For example, a control device of the power machine can receive signals from an operator input device, and cause a hydraulic actuator of a work element to move (e.g., extend or retract), based on the received signals.

The discussion above is merely provided for general background information and is not intended to be used as an aid in determining the scope of the claimed subject matter.

SUMMARY

Some embodiments of the disclosure are directed to controlled filtering of command signals from an operator input device (e.g., a joystick, a pedal, an actuatable input device on a remote control assembly, a personal computing device such as a mobile phone, etc.) that is being used to control a work element of the power machine. In some cases, the command signals can be filtered in particular with a band stop filter that can modulate (e.g., attenuate) the command signals within a particular frequency band. For example, filtering command signals over a frequency band that includes a relevant resonant frequency (e.g., of the power machine in combination with an operator that is engaging the input device) can help to reduce unwanted frequency input during control of an implement. In some cases, filtering of this type can generally help to prevent excessive vibration of an implement during command oscillation (i.e., shaking) of the implement, or other detrimental effects that might otherwise occur during operation to move the implement with particular frequencies.

In some embodiments, a power machine can include a main frame, and a work element supported by the main frame. The work element can include a lift arm moveably secured to the main frame, an implement carrier movably secured to the lift arm, an implement secured to the implement carrier, and an actuator that is actuatable to move one of: the implement with respect to the lift arm or the lift arm with respect to the main frame. The power machine can include an operator input device that is configured to transmit actuation command signals based on operator input, to control the actuator of the work element. The power machine can include a control system that can include a control device in communication with the operator input device and the actuator. The control device can be configured to: receive, from the operator input device, an actuation command signal that commands movement of the implement; filter the actuation command signal, using a band-stop filter, to generate a filtered actuation command signal; and control movement of the implement, via the actuator, based on the filtered actuation command signal.

In some embodiments, a control device can be configured to filter an actuation command signal, using a band-stop filter, to attenuate a vibrational resonant frequency component of a power machine.

In some embodiments, a band-stop filter can have a stop band with a non-zero gain.

In some embodiments, a non-zero gain can be greater than or equal to 0.5.

In some embodiments, a control device can be configured to amplify at least one frequency component of an actuation command signal or a filtered actuation command signal to generate an amplified actuation command signal.

In some embodiments, at least one frequency component can be greater than a threshold frequency. The threshold frequency can be greater than a vibrational resonant frequency of a power machine.

In some embodiments, at least one frequency component can be greater than at least 5.5 Hz.

In some embodiments, an actuator can be one of: a tilt actuator that can be coupled to an implement to adjust an attitude of the implement relative to a lift arm, or a lift actuator that is coupled to the lift arm to adjust the lift arm relative to the frame.

In some embodiments, an operator input device can include at least one of a pedal, a joystick mounted in the machine, an actuatable input device on a remote control, or a personal computing device.

In some embodiments, a computer-implemented method is provided for controlling movement of a work element of a power machine. The method can include receiving, from an operator input device, an actuation command signal for commanded movement of an actuator of the work element, and filtering the actuation command signal, using a band-stop filter, to generate a filtered actuation command signal. Filtering the actuation command signal can attenuate a frequency component of the actuation command signal that corresponds to a vibrational resonant frequency of the power machine. The method can include causing the actuator of the work element to move based on the filtered actuation command signal.

In some embodiments, a method can include determining a frequency of an actuation command signal. Filtering the actuation command signal can be based on the determined frequency of actuation command signal.

In some embodiments, filtering an actuation command signal can avoid attenuating a frequency component of the actuation command signal that is about 0 Hz.

In some embodiments, a method can include amplifying at least one frequency component of an actuation command signal or a filtered actuation command signal to generate an amplified actuation command signal.

In some embodiments, a method can include determining a frequency of an actuation command signal. Amplifying the actuation command signal can be based on the determined frequency of the actuation command signal.

In some embodiments, at least one frequency component of an actuation command signal that can be amplified can be greater than a cutoff frequency of a frequency response of an input handling system in which actuation command signals are provided thereto to move the actuator.

In some embodiments, an actuation command signal can include a first frequency. An actuator of the work element can be caused to move at a second frequency that can be less than the first frequency.

In some embodiments, a power machine can include a main frame, and a work element supported by the main frame. The work element can include a lift arm moveably secured to the main frame, an implement carrier movably secured to the lift arm, and an actuator that can be configured to move the implement with respect to the lift arm, or the lift arm with respect to the main frame. The power machine can include an operator input device that can be configured to transmit actuation command signals based on operator input, to control the actuator of the work element, and a control system that can include a control device in communication with the operator input device and the actuator. The control device can be configured to receive, from the operator input device, an actuation command signal that can command movement of the actuator, and control the actuator for movement of the implement based on, for a first frequency range of the actuation command signal, filtering the actuation command signal using a band-stop filter to generate a filtered actuation command signal.

In some embodiments, a control device can be configured to control an actuator for movement of an implement based further on for a second frequency range of an actuation command signal below the first frequency range, not attenuating or amplifying the magnitude of a frequency of the actuation command signal.

In some embodiments, a control device can be configured to control an actuator for movement of an implement based on for a third frequency range of an actuation command signal, amplifying the actuation command signal to generate an amplified actuation command signal.

In some embodiments, a control device can be configured to control an actuator for movement of an implement based on for a fourth frequency range of an actuation command signal, causing the actuator to reciprocally move at a reduced frequency as compared to the actuation command signal.

In some embodiments, a first frequency range can include a vibrational resonant frequency of a power machine.

In some embodiments, an actuator can be a tilt actuator configured to change an attitude of an implement carrier relative to a lift arm.

In some embodiments, an actuator can be a direct current (DC) actuator.

In some embodiments, a control system for controlling movement of a work element of a power machine can include a control device, and an operator input device in communication with the control device. The control device can be configured to receive, from the operator input device, an actuation command signal for commanded movement of an actuator of the work element, modify the actuation command signal within a frequency band among a plurality of different frequency bands, based on a frequency within the actuation command signal being within the frequency band, and control movement of the actuator of the work element based on the modified actuation command signal.

In some embodiments, modifying an actuation command signal can include at least one of attenuating at least one frequency component of the actuation command signal, or amplifying at least one frequency component of the actuation command signal.

In some embodiments, modifying an actuation command signal can include attenuating the actuation command signal, within a frequency band, to a value of less than or equal to 50% of the actuation command signal as received from the operator input device at the control device.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

Figure 1:
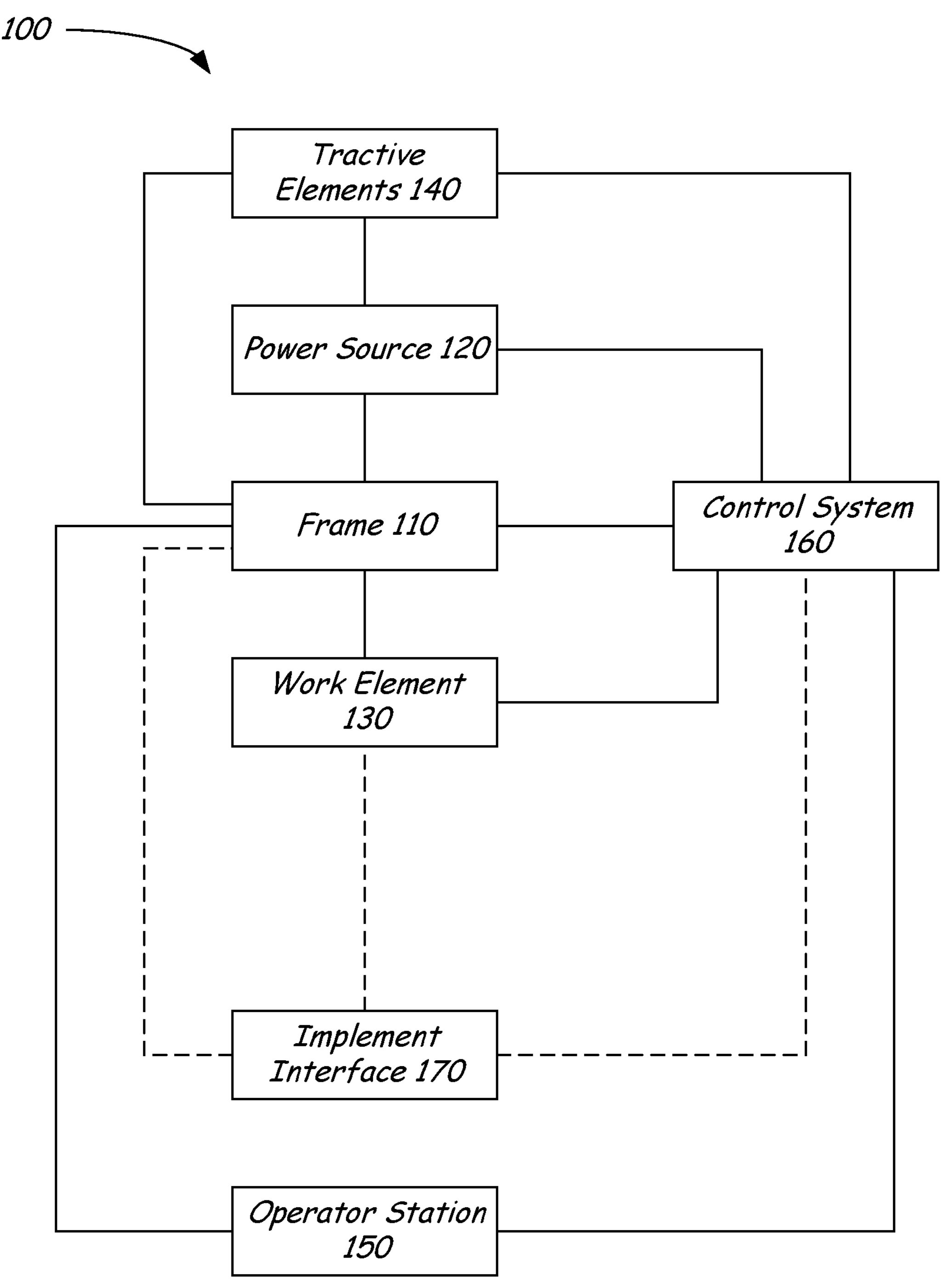
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways.

The terminology in this document is used for the purpose of description and should not be regarded as limiting. Words such as "including," "comprising," and "having" and variations thereof as used herein are meant to encompass the items listed thereafter, equivalents thereof, as well as additional items.

Some discussion below describes improved control systems of power machines, including methods of processing electrical signals received from operator input devices. For example, in some embodiments, the control system of the power machine (e.g., the control device) can receive an electrical signal from an operator input device (e.g., a joystick, a pedal, etc.) that can be moved (e.g., pressed, oriented, etc.) that corresponds to a commanded movement of one or more actuators. This movement of the operator input device can be translated into an electrical command signal (e.g., by the operator input device), which can be used by a control system to actually cause movement of an actuator of a work element (e.g., a lift cylinder for lift arm with a bucket coupled thereto). In this way, an operator, via an operator input device, can command movement of a work element (e.g., tilting of the implement of the work element), including via electronic command signals.

In some cases, undesirable noise can be inadvertently introduced into the electrical signals that control the movement of the actuator of the power machine, including as a result of vibration of the power machine. In some cases, vibration of a power machine or other factors can cause the introduction of noise via noisy operator input at an input device. In this regard, vibration of the power machine can include, for example, vibration of the structure of the power machine in combination with an operator who is supported by the structure and transmits vibrations from the structure to an input device. Thus, for example, vibrations of a power machine can induce vibration in (or transmit vibration through) an operator, and the induced (or transmitted) vibration can result in a vibrational component of the operator's movement of an input device. Of note, conventional control systems may not necessarily recognize this vibrational component of operator input as noise, or properly address it as such, because the noise may correspond to an actual physical movement of an input device by an operator.

In some cases, the adverse effects of power machine vibrations can be particularly notable around a resonant (i.e., natural) frequency of a power machine (e.g., of a main frame of a power machine in combination with an operator supported by the power machine). For example, vibration of the structure of a power machine may be of particularly high magnitude around a natural frequency, and induced operator vibration that is inadvertently transmitted to an input device may therefore be of relatively high magnitude.

Thus, vibration of a power machine can cause, via an operator input device, a corresponding—and undesired—commanded vibration of a work element (e.g., bucket or other implement), with the potential for particularly large effects for commanded oscillations near a resonant frequency for the power machine. This can result in suboptimal operator control of work elements of a power machine.

Some embodiments according to this disclosure can address these issues, including via reduction of undesirable noise in command signals from operator input devices. For example, in some embodiments, a control system can be configured to mitigate undesirable noise in a command signal from an operator input device by filtering (e.g., attenuating) the command signal over a particular frequency band. For example, a control device can be configured to filter a command signal from an operator input device by using a band-stop (e.g., notch) filter that attenuates (or otherwise modulates) the command signal from the operator input device over a particular frequency band. In some cases, a band-stop filter can be applied over a frequency band that includes a frequency corresponding to the resonant vibration frequency of the power machine. Accordingly, undesirable frequency components of a command signal from an operator input device can be removed (or otherwise modulated), including frequency components as may correspond to a resonant frequency of a power machine, with corresponding improvement in operator control.

In some embodiments, filtering by a band-stop can include somewhat limited attenuation of a command signal over a frequency band. For example, although undesired vibrational input may tend to occur with a high magnitude over a particular frequency band, it is also possible that an operator may intentionally command an oscillation of a work element within that particular frequency band. In such a case, excessive attenuation of the command signal over the frequency band may tend to eliminate an intended operator command as well as input noise. in some embodiments, gain of a particular filter can be tuned in order to preserve an appropriately high level for a command signal over a particular frequency band. In one example, a notch filter can be configured to attenuate a signal by 50% or less, at most, within a particular frequency band. It should be understood though, that different attenuations can be used in various applications.

Figure 2:
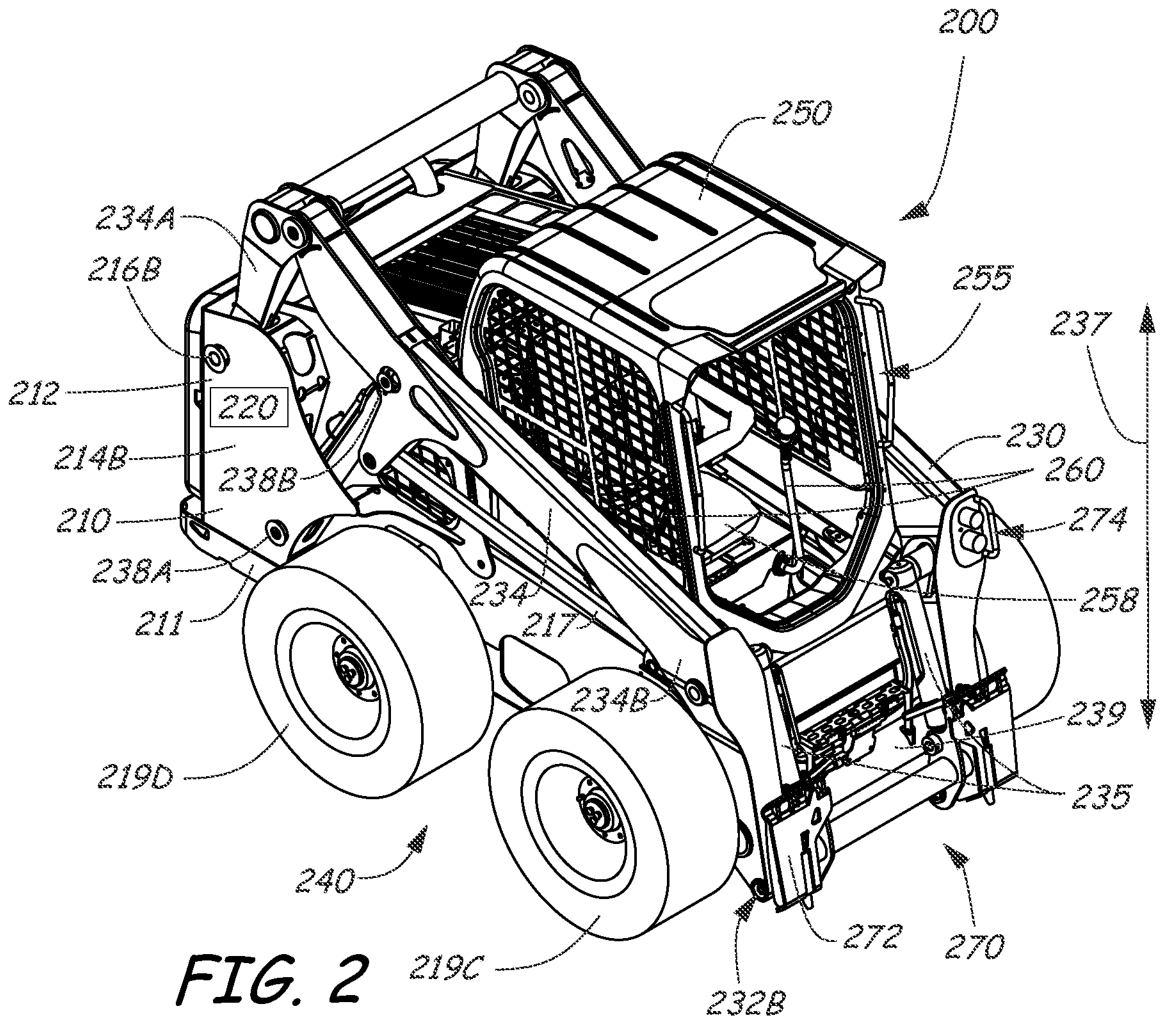
FIG. 2 is a perspective view showing generally a front of a power machine on which embodiments disclosed in this specification can be advantageously practiced.
Figure 3:
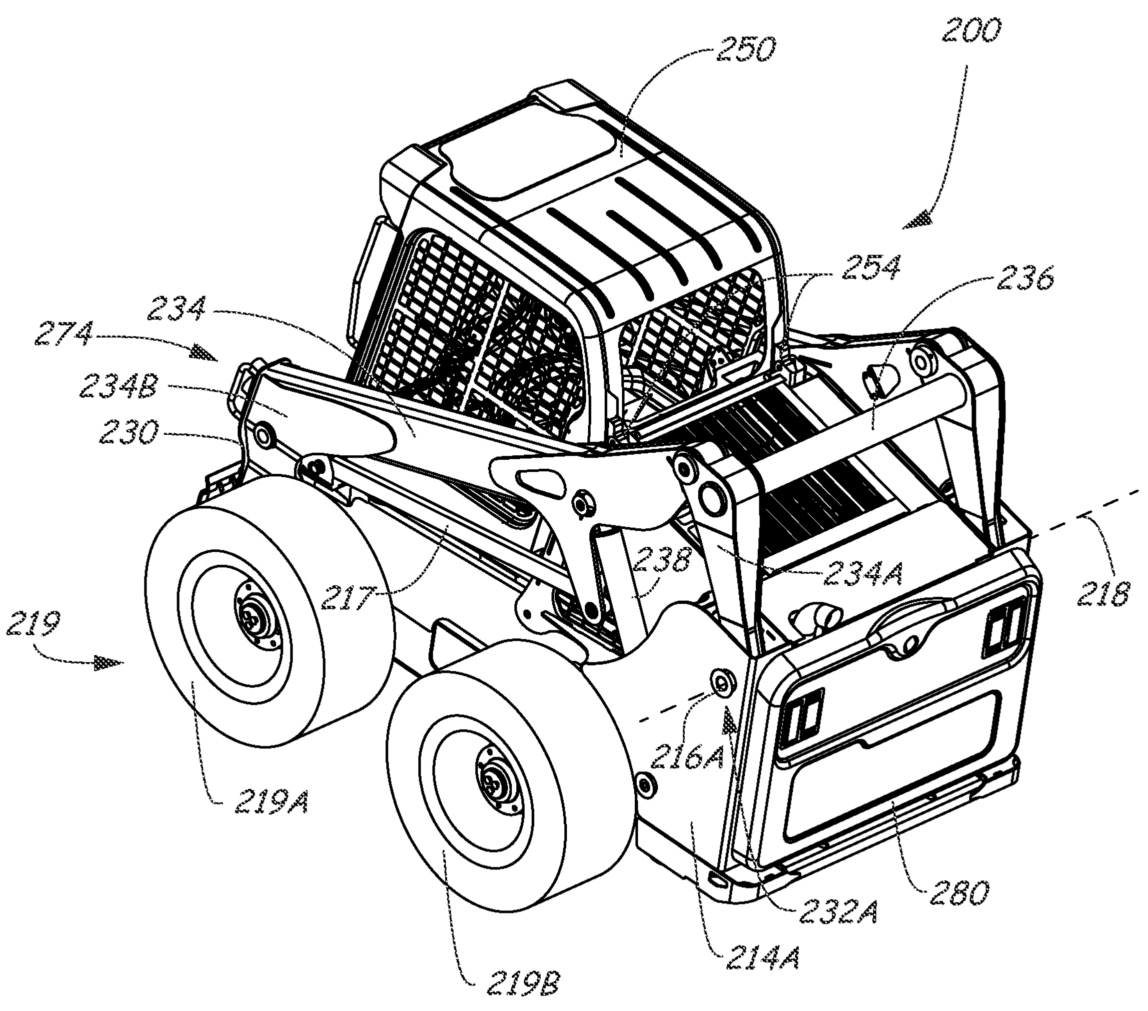
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Some embodiments of the disclosure, and in particular the control system, is presented below in the context of power machines implemented as loaders (e.g., skid steer loaders). However, in other embodiments, the control system (or other features) can be implemented using other power machines, including articulated power machines.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm in the illustrated example, can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, the implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals, and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such as walk behind loaders may not have a cab nor an operator compartment, nor a seat. The operator position on such loaders is generally defined relative to a position where an operator is best suited to manipulate operator input devices.

Various power machines that can include and/or interact with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 233 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 that is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled to the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators (which can, for example be used in some embodiment in the place of hydraulic cylinders) and/or an electronic controller on an implement. The implement power source 274 also exemplarily includes electrical conduits that are in communication with a data bus on the excavator 200 to allow communication between a controller on an implement and electronic devices on the loader 200.

Figure 4:
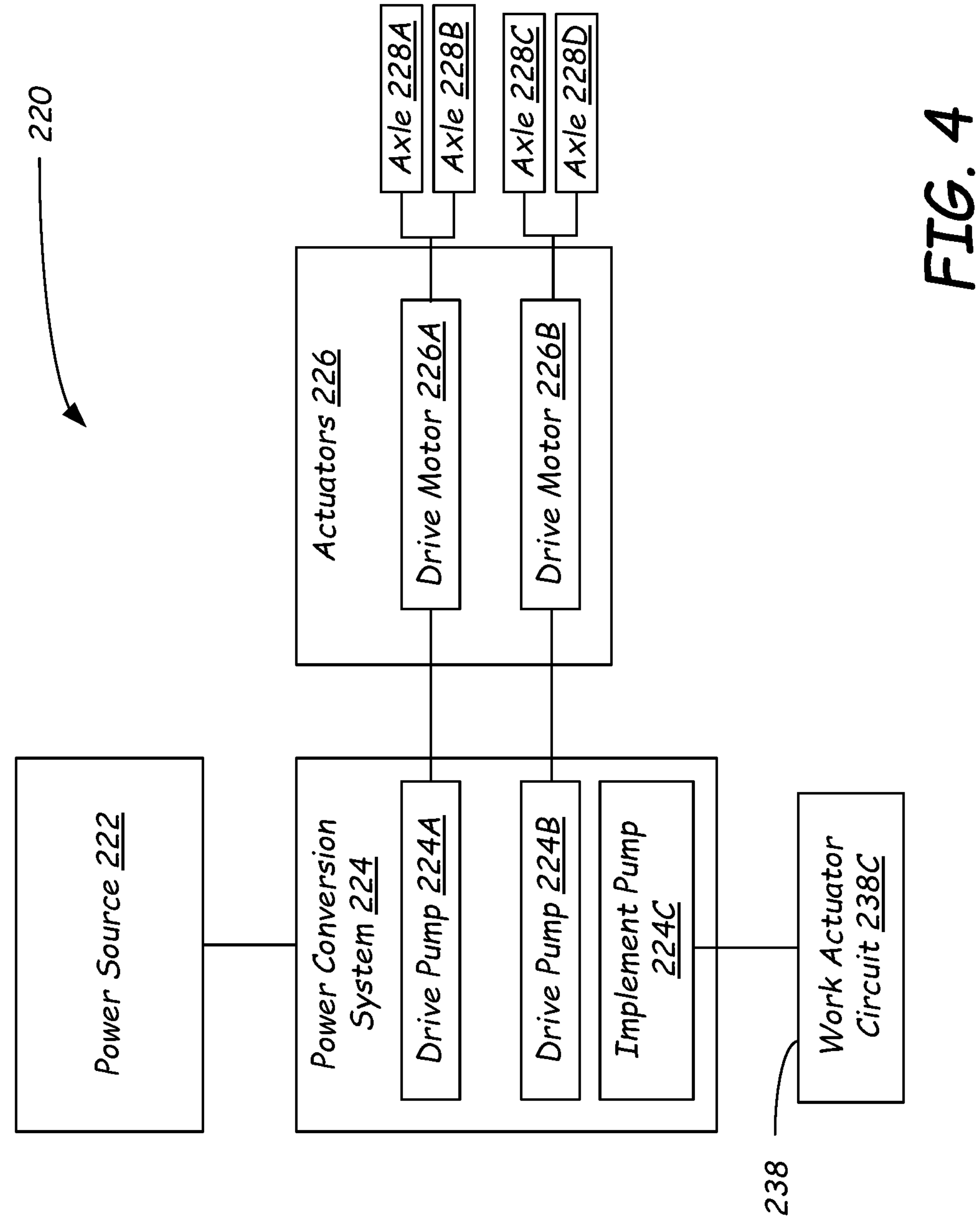
FIG. 4 is a block diagram illustrating components of a power system of a loader such as the loader of FIGS. 2 and 3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
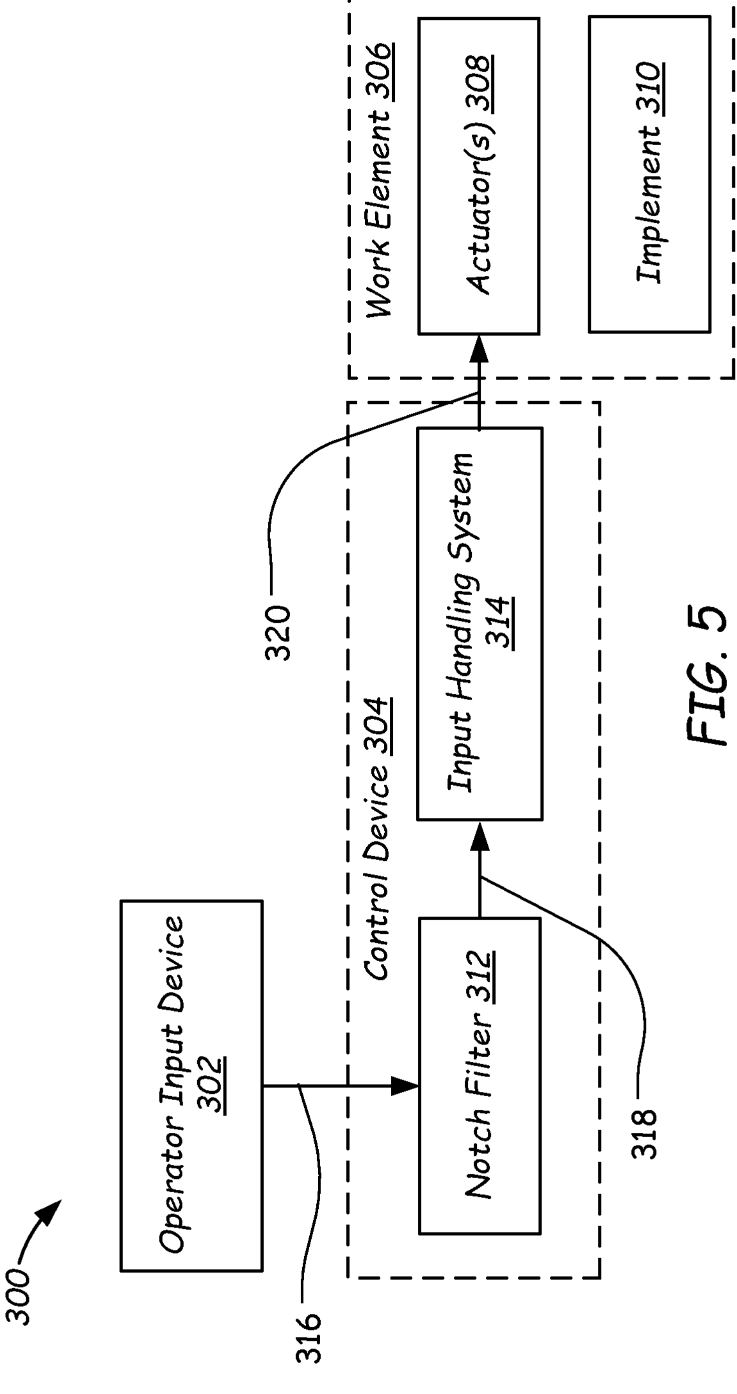
FIG. 5 is a schematic illustration of a block diagram of a control system according to some embodiments of the disclosure, for control of an implement of a power machine.

FIG. 5 shows a schematic illustration of a block diagram of a control system 300, which can be used to provide improve control of a work element of a power machine, based on signals from an operator input device for the power machine. The control system 300 can be implemented on various power machines described above, such as, for example, the power machine 100, the loader 200, or other power machines. Similarly, although control of a bucket based on a pedal input device may present a particularly beneficial implementation, the control system 300 can be implemented and can generally be used to control any variety of work elements based on input from any variety of operator input devices.

As shown in FIG. 5, the control system 300 can include an operator input device 302, a control device 304, and a work element 306 having at least one actuator 308. The operator input device 302 can be implemented in different ways, including as described above. For example, the operator input device 302 can be a joystick, a pedal, a button, a switch, a lever, a handgrip, etc. Generally, the operator input device 302 can be moved by an operator (e.g., pressed, pulled, shifted, etc.) into different positions or orientations to command movement (e.g., extension or retraction) of the actuator 308 of the work element 306 (e.g., a tilt cylinder for an implement, or a lift cylinder for a lift arm). As alluded to above, in a notable use case, the operator input device 302 is a pedal, which is often generally aligned with a cab so that vibration in an operator that is induced by a power machine may be more readily transmitted to a control system as an apparent operator input. However, some embodiments can include a variety of other types of input devices.

The control device 304 can also be implemented in different ways. For example, the control device 304 can be implemented as a processor device, a microcontroller, a field-programmable gate array, a programmable logic controller, logic gates, etc. In addition, the control device 304 can also include other computing components, such as memory, inputs, other output devices, etc. The control device 304 can also be configured to implement some or all of the steps of the processes described herein, as appropriate, which can be retrieved from memory. In some embodiments, the control device 304 may include multiple control devices (or modules) that can be integrated into a single component or arranged as multiple separate components. In some embodiments, the control device 304 can be part of a larger control system (e.g., the control system 160 of FIG. 1) and can accordingly include or be in electronic communication with a variety of control modules, including hub controllers, engine controllers, drive controllers, and so on.

Similarly to the other components, the work element 306 and the actuator 308 can be implemented in a variety of ways, including as described in detail above. For example, the work element 306 of the power machine can include a lift arm structure with a lift arm pivotally attached to a frame of the power machine. Additionally, the work element can include an implement that is movably coupled to the lift arm (e.g., to an implement interface of the work element 306). In some cases, the at least one actuator 308 can include a tilt actuator that is coupled to the implement 310 and to the lift arm to adjust the attitude of the implement 310 relative to the lift arm (e.g., by extending and retracting the tilt actuator), although discussion herein can also generally apply to other actuators, including lift actuators configured to raise and lower a lift arm. Thus, for example, the tilt actuator can control tilting of the implement 310 based on commands from the operator input device 302. In this way, the orientation of the implement 310 (e.g., a bucket, a broom, an auger, a backhoe, forks, etc.) can be adjusted by the operator, including for tasks that include shaking the implement 310 (e.g., to remove material from it).

The control device 304 is generally configured to implement a band-stop filter relative to signals from the operator input device 302, with the filter shown in particular in FIG. 5 as a notch filter 312. Further, the control device 304 also includes an input handling system 314 which can be configured according to a variety of generally known approaches to convert command signals from an operator input device (e.g., commanded implement position) into command signals for an actuator (e.g., commanded position, velocity, and acceleration of a spool valve to control a hydraulic actuator). In some cases, the notch filter 312 and the input handling system 314 can be implemented as distinct software or hardware modules (e.g., the notch filter 312 being an electrical filter) within the control device 304, although other approaches are also possible (e.g., implementation as a single, integrated control module).

Generally, according to known approaches to band-stop filtering, the notch filter 312 can provide a frequency response that includes a stop band situated between pass bands (e.g., as defined by a low cut-off frequency and a high cut-off frequency), with the corresponding modulation (e.g., attenuation) of input signals being concentrated in the stop band. In some configurations, each of the cut-off frequencies can be defined at the position in which there is a 3 decibel ("dB") decrease in the gain of the filter from the gain of the filter at the nearest pass band (e.g., which has a relatively flat gain).

In some configurations, a center frequency of the notch filter 312 (e.g., at a midpoint between low and high cut-off frequencies) can substantially correspond to a resonant vibrational frequency of a power machine (e.g., may deviate from the resonant frequency of a power machine by less than 20%, less than 10%, or less than 5%). Thus, in some cases, the center frequency of the notch filter 312 can be less than or equal to about 10 Hertz ("Hz"), and more specifically, can be less than or equal to about 7 Hz, or approximately 5 Hz (i.e., within 10% of 5 Hz), although relevant natural frequencies may vary considerably between different power machines and operational configurations. In some cases, the high cut off frequency of the notch filter 312 can be less than or equal to about 10 Hz, and in particular, less than or equal to about 7 Hz. In some configurations, the width of the stop band of the notch filter 312 can be approximately 2 Hz, approximately 1.5 Hz, approximately 1 Hz, etc., (i.e., deviating by less than 10 percent from these values).

The input handling system 314 is generally configured to further modulate command signals from the operator input device 302 to ensure appropriate operation of the work element 306. As also noted above, a variety of known control modules can be used in this regard. In some cases, the input handling system 314 can implement kinematics-based control as part of a closed loop control system to ensure that appropriate control signals are provided to the at least one actuator 308. For example, the input handling system 314 can include a kinematic filter that modulates command signals based on the capabilities of the power machine and of specific components thereof (e.g., based on kinematic aspects of motors that move control valves for hydraulic actuators). In this regard, for example, as also generally discussed above, the input handling system 314 can ensure that actual commanded movement of an actuator generally corresponds to an operator-commanded movement, without exceeding the physical capabilities (or desired performance) of the actuator.

As a specific example, if an operator input at an operator input device 302 corresponds to a commanded position change for a valve spool at an excessive velocity or acceleration, the input handling system 314 can modulate one or more components of the corresponding command signals so that an approximation of the commanded movement is provided, but within the capabilities of the relevant system (e.g., of the actuator(s) 308). In some cases, direct current ("DC") actuators for movement of spools may have relatively limited maximum velocities, so that higher frequency control signals are effectively heavily filtered by the input handling system 314. Thus, in some cases, the input handling system 314 can inherently provide a low pass filter to the command signals (e.g., a low pass filter with a first order frequency response).

In the illustrated example, the notch filter 312 is implemented prior to the input handling system 314. Correspondingly, command signals can be filtered by the notch filter 312 prior to being modulated by the input handling system 314. In some cases, this arrangement can ensure appropriate interaction between the notch filter 312 and the input handling system 314, without excessive loss of command information, although other configurations are also possible. For example, for systems in which inputs from an operator provide a command for a particular position of an actuator (or other similar parameter), the notch filter 312 can be configured to modulate only position commands. In contrast, however, the input handling system 314 may produce a set of corresponding target position, velocity, and acceleration commands for any given operator-command movement, to implement the commanded position within the capabilities of the relevant actuators (e.g., DC motors). Thus, applying the notch filter 312 after the input handling system 314 could result in selective filtering only of the position output from the input handling system 314, and a corresponding misalignment between the commanded velocity and acceleration from the input handling system 314 and the modulated position command from the notch filter 312.

As generally noted above, in some embodiments, the control system 300 can provide improved control of work elements as compared to conventional control systems. For example, in some implementations, the operator input device 302 transmits an actuation command signal 316 (e.g., an electrical signal) to the control device 304, (e.g., using an analog to digital converter ("ADC")). The actuation signal 316 is provided to the notch filter 312, which can use known filtering approaches to filter (e.g., digitally filter) the actuation signal 316 according to the frequency response (and phase response) of the notch filter 312 and output a filtered actuation signal 318 (e.g., a filtered electrical signal). This filtered actuation signal 318 is provided to the input handling system 314, which can, in some configurations, further modulate the filtered actuation signal 318 (e.g., via a kinematic module, which may sometimes effectively also act as a low pass filter). The input handling system 314 can then transmit the filtered and modulated actuation signal as a driving signal 320 to move the at least one actuator 308 of the work element 306. Thus, the control system 300 can move the implement 310, based on input at the operator input device 302, after signal modulation by the notch filter 312 and the input handling system 314. Additionally, as also detailed below, implementation of the notch filter 312 can help to reduce the effect on movement of the actuator(s) 308 from unwanted vibrational input at the operator input device 302 (e.g., due to resonant frequency vibration of the power machine).

Figure 6:
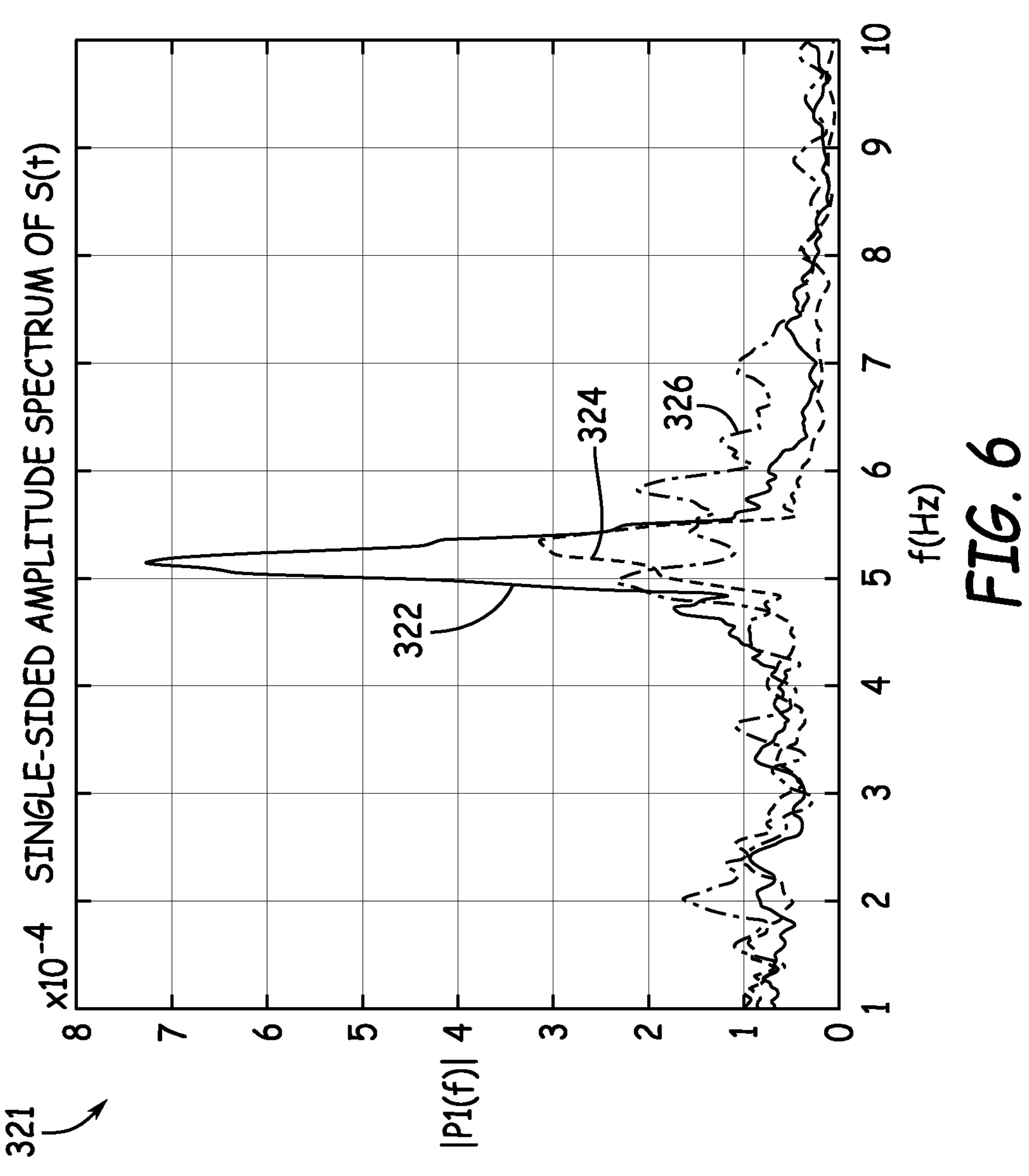
FIG. 6 is a graph of power spectrum of control signals for actuation of an implement of a power machine, including for control signals modulated according to some embodiments of the disclosure.

In this regard, as also noted above, control signals for an implement can sometimes exhibit undesired frequency peaks, including at a relevant natural frequency of an associated power machine. For example, FIG. 6 shows a graph 321 of the frequency response of three different configurations of a control system during an operator-provided oscillating command signal. In particular, the frequency response 322 corresponds to processing of the operator input without the notch filter 312 and the input handling system 314. In this case, a large peak occurs at approximately 5.2 Hz, which corresponds to a vibrational resonant frequency of the power machine and could result in unwanted oscillation (e.g., uncontrolled oscillation) of the relevant work element (e.g., implement) at that peak frequency.

Still referring to FIG. 6, the frequency response 324 corresponds to processing of the same operator input with a low-pass filter (e.g., as provided by, or in combination with, the input handling system 314) but without the notch filter 312. In this case, although there is a considerable decrease in magnitude of the large peak at approximately 5.2 Hz, there is still a notable peak at a similar frequency. In other words, a low pass filter alone (e.g., via a kinematic control system) may not appropriately mitigate the adverse effects of natural-frequency vibrations on implement control. Further, as also discussed above, a low pass filter alone may tend to eliminate intentional higher-frequency operator input, as well as undesired vibrational input.

In contrast to the frequency responses 322, 324, the frequency response 326 corresponds to processing of operator input with the notch filter 312 and the input handling system 314. As shown in FIG. 6, use of the notch filter 312 allows the large peak at approximately 5.2 Hz to be substantially removed, which can provide substantially improved performance relative to inadvertent vibrational commands that may be received from an operator input device (e.g., as may result from vibration of a power machine as a whole).

Figure 7:
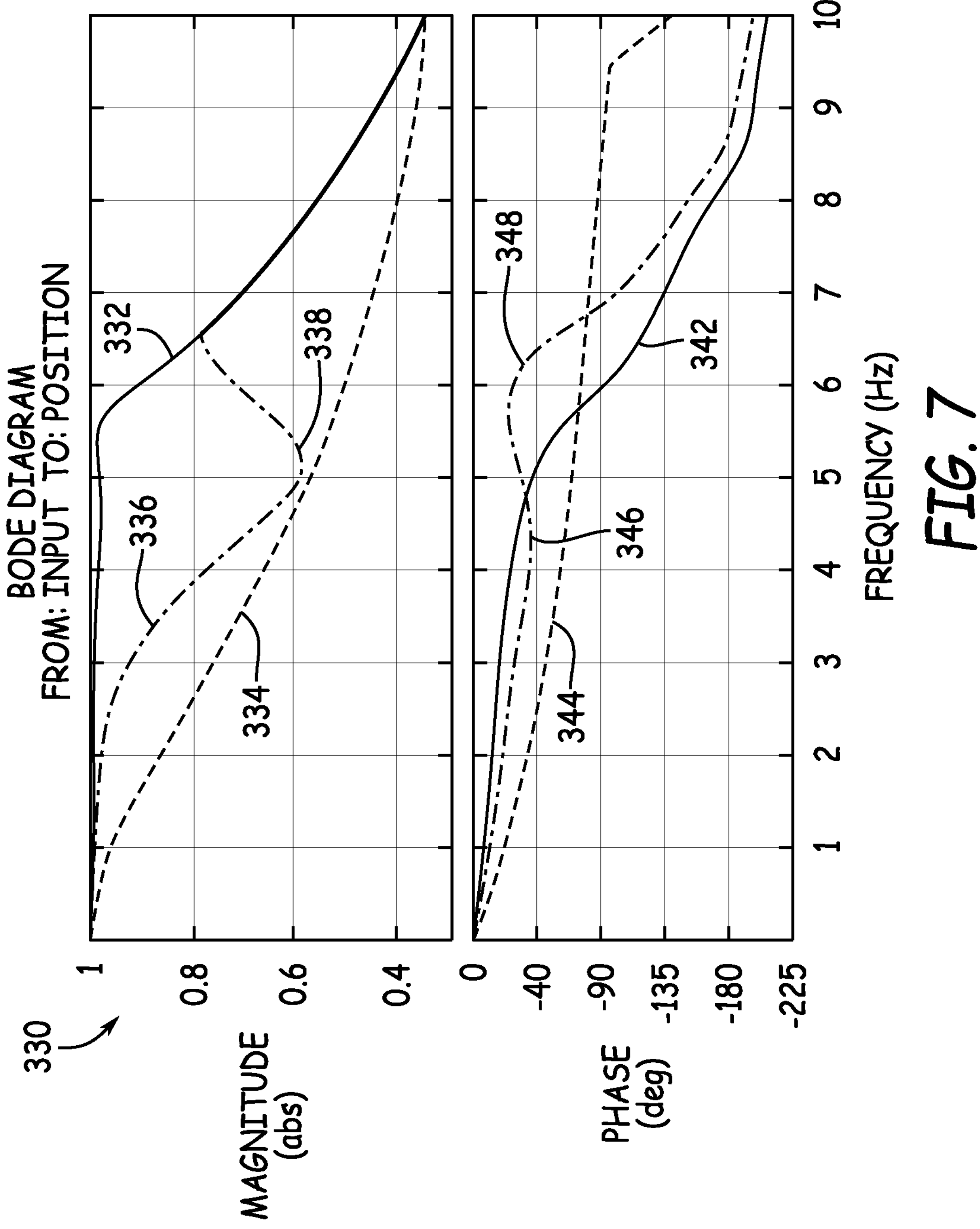
FIG. 7 is a bode plot of frequency response and phase response of control signals for actuation of an implement of a power machine, including for control signals modulated according to some embodiments of the disclosure.

FIG. 7 shows a Bode plot 330 of the frequency response for the three different control configurations of FIG. 6, and the corresponding phase response. In particular, the curves 332, 342 correspond to the configuration used to generate the frequency response 322, the curves 334, 344 correspond to the configuration used to generate frequency response 324, and the curves 336, 346 correspond to the configuration used to generate the frequency response 326. As illustrated in FIG. 7, the curve 336 exhibits a dip 338 at approximately 5.2 Hz, which corresponds to the attenuation of the vibrational resonant frequency of the power machine by the notch filter 312 as can effectively mitigate this unwanted component of operator input.

In some cases, including as illustrated in FIG. 7, a band-stop (e.g., notch) or other filter, including combinations of filters in some cases, can be configured to attenuate an actuation command signal by a limited amount. For example, the notch filter 312 is configured to attenuate an actuation command signal from an operator input device by only 50% or less (i.e., so that the magnitude of any frequency of an attenuated signal, within a particular band, has a value of greater than 50% of the magnitude at the same frequency in an actuation command signal, as received from the operator input device at the notch filter 312). Correspondingly, intentional operator input around the frequency band of the notch filter 312 can be at least partially preserved and passed on (e.g., via the input handling system 314) to a relevant actuator of a work element (e.g., a tilt actuator or lift actuator). This may result in improved removal of noisy input (e.g., due to natural frequency signals inadvertently transmitted by an operator to a pedal) while also potentially preserving a substantial amount of any intentional operator commands at those frequencies. As a result, an operator may perceive little increase in difficulty to achieve an intentional movement of a work element within the frequency band of the notch filter 312, but unwanted movement due to unintentional vibrational input may still be substantially reduced.

Additionally, relatively limited attenuation of command signals by a notch filter can result in improved performance for operator inputs with frequencies near or above an upper limit of the frequency band of the notch filter. For example, as shown in FIG. 7, the magnitude of the curve 336 is substantially equivalent to the magnitude of the curve 332 at frequency values that are more than approximately 1 Hz above the center of the region attenuated by the notch filter 312. Thus, operators may experience notably improved control at higher frequencies, as compared to conventional control systems (see, e.g., the curve 334) even as the notch filter 312 helps to reduce the effects of inadvertent (e.g., natural-frequency) operator inputs. In this regard, as also generally noted above, decrease in magnitude of the curves 332, 336 beyond approximately 6 Hz may simply reflect the low-pass filter effect that may be effectively imposed by the kinematic limitations of the relevant actuators. In other embodiments, other curve profiles at higher frequencies (e.g., beyond a frequency band of a band-stop filter) can also occur.

Regarding the phase response plot of FIG. 7, the curve 346, which corresponds to the notch filtered signal also exhibits favorable phase shift behavior as compared to some conventional systems. For example, although notch filters can sometimes cause a positive phase shift, the notch filter 312 interacts with the kinematics-based effective low-pass filter of the power machine at large to result in a negative, relatively low magnitude, phase shift, including at frequencies higher than a peak frequency 348 at approximately 5.8 Hz, which is slightly higher than the frequency of the dip 338 at approximately 5.2 Hz (see the curve 336). Because the phase shift from the control system 300 is relatively small, even up to a relatively high frequency of input (e.g., approximately 6 Hz), an operator is unlikely to actually perceive a noticeable lag in overall system response and may even perceive an improvement (i.e., shorter lag) than with conventional systems.

Although FIGS. 6 and 7 illustrated the results of one beneficial configuration of a control system according to embodiments of the disclosure, different configurations are possible. For example, a frequency band size, upper and lower frequency limits, a gain, or other characteristic of a band-stop filter can be modified as appropriate to provide improved performance for a particular power machine configuration or operator. In some embodiments, a shape (e.g., a center, limits, or a depth) of a notch filter can be adjusted based on active measurement of other power machine parameters. For example, runtime or calibration data can be used to determine a relevant natural frequency (e.g., for a particular operator within a particular power machine) and a notch filter can be adjusted accordingly—e.g., to align a center of a frequency band of the notch filter with the determined natural frequency or configure a depth of the notch filter to correspond to the magnitude of the natural frequency input.

In some embodiments, a notch filter or other similar module according to the disclosure can be configured to implement amplification of an actuation command signal. For example, if enhanced oscillation of a particular actuator at a particular frequency or frequency range is desired, a control system (e.g., the control system 300) can be configured to amplify actuation command signals (i.e., to apply a gain of greater than 1) near that particular frequency or frequency range. In some cases, this amplification can effectively enhance an operator's ability to cause a desired oscillation (e.g., to shake dirt from a bucket). Indeed, in some embodiments, amplifying gain can be introduced at a particular frequency or frequency band that is different than the frequency of an actuation command signal from an operator input device (e.g., to mitigate the kinematics-driven reduction in response at higher frequencies).

In some embodiments, a vibration sensor (e.g., a transducer including a piezoelectric transducer) can be coupled to a power machine (e.g., to the frame of the power machine), and sensed vibration of the power machine (or a quantity derived therefrom) can be subtracted from an actuation command signal to further remove unwanted input noise. Similarly, in some embodiments, a relevant (e.g., natural) frequency of a power machine can be actively monitored during operation and a control system (e.g., the control system 300) can be modified appropriately if the frequency substantially changes relative to an expected value.

Figure 8:
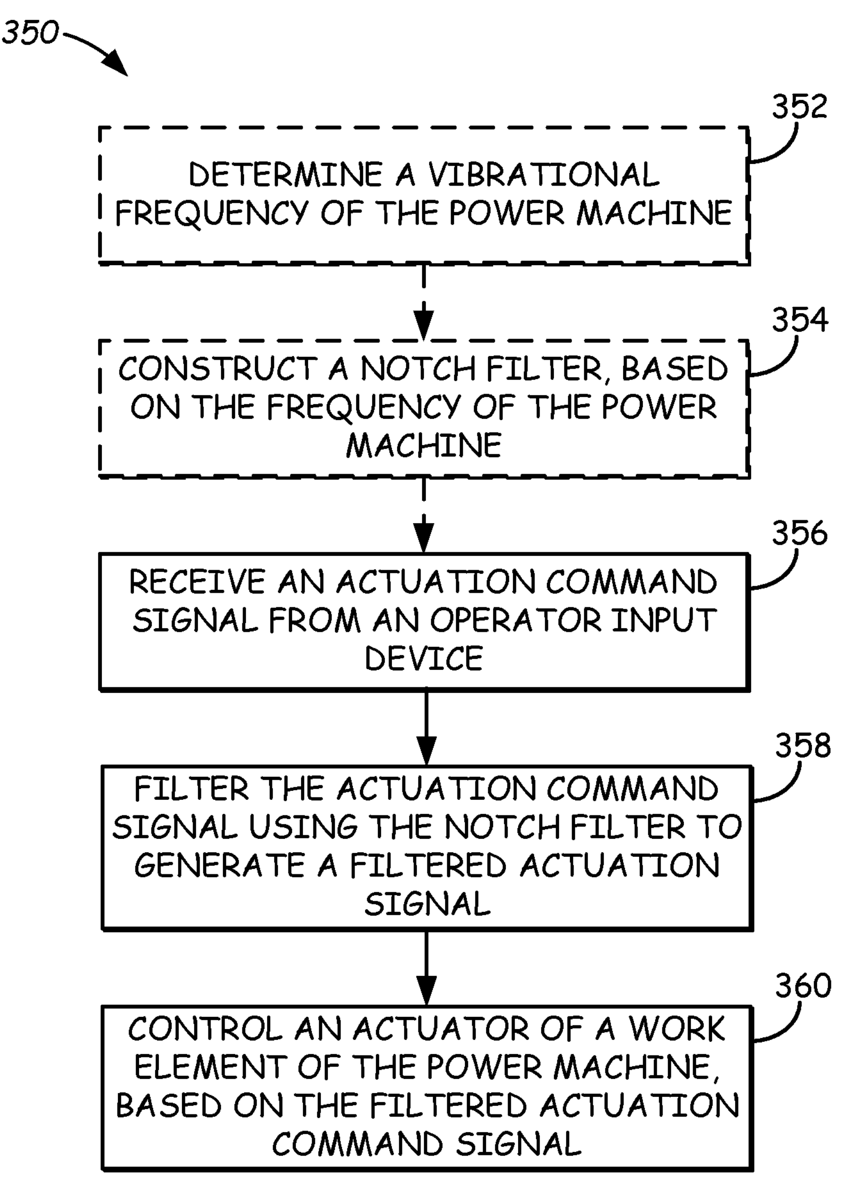
FIG. 8 is a flowchart of a process for controlling movement of a work element of a power machine.

FIG. 8 shows a flowchart of a process 350 for controlling movement of a work element of a power machine, which can be implemented using one or more computing devices (e.g., the control device 304). The process 350 can be implemented using (or for) any of the power machines described herein, including, for example, a loader (e.g., a skid-steer loader), an excavator, etc. Generally, as also discussed below relative to block 358, the process 350 can include filtering an actuation command signal using a notch filter. In some cases, a notch filter may be predetermined for a particular power machine or operating condition. In some cases, a notch filter can be determined (e.g., updated) based on runtime information. For example, at block 352, the process 350 can sometimes include the one or more computing devices determining a vibrational frequency of the power machine. In some cases, this can include the one or more computing devices determining a resonant vibrational frequency of the power machine, for example, by locating a peak within a frequency spectrum produced from vibrational signal(s). In some cases, the vibrational signals can be acquired from a vibration sensor, which can be placed on the power machine (e.g., the frame of the power machine).

In some cases, at block 354, the process 350 can also include the one or more computing devices constructing a band-stop filter (e.g., a digital or other notch filter) based on the frequency of the power machine. For example, the one or more computing devices can identify a frequency response of a notch filter, which can include one or more of determining the frequency span of the stop band of the notch filter, determining the frequency span of each of the pass bands of the notch filter, determining one or more corner frequencies of the notch filter, determining the gain of each of the regions of the notch filter (e.g., the attenuation of the magnitude for each of the regions of the notch filter), or determining the center frequency of the stop band of the notch filter (e.g., so that the center frequency of the stop band of the notch filter substantially corresponds to the frequency of the power machine, such as the resonant frequency of the power machine). As generally discussed above, parameters of a notch filter can in some cases be determined so as to reduce the effect of natural frequency vibrations, to improve operators' ability to command oscillations at particular frequencies, or to provide various other benefits.

In some configurations, a band-stop filter (e.g., the notch filter) can be associated with and can be for a specific type of power machine. In this way, a hardware module (e.g., an electronic band-stop filter) or a digital band-stop filter can be optimally configured for use in a specific type of power machine, e.g., which can characteristically have the same resonant frequencies or other relevant characteristics regarding system control and response. Accordingly, a hardware module or digital band-stop filter can be easily applied to each power machine of the specific power machine to improve operator handling. In addition, a digital band-stop filter approach can allow a much faster rollout to improve the operator handling (e.g., as compared to installing an electronic band-stop filter for each power machine).

As also noted above, although a particular filter for actuation command signals can sometimes be determined during operation of a power machine (e.g., initially or as part of an update routine), one or more filters or parameters thereof can sometimes be predetermined. For example, in some cases, one or more relevant vibrational frequencies (e.g., natural frequencies for particular power machine configurations or operators) can be predetermined and retrieved from memory, as appropriate, to inform filtering of actuation command signals from an operator input device. Similarly, the characteristics of one or more notch (or other) filters can sometimes be predetermined, in whole or in part.

At block 356, the process 350 can include the one or more computing devices receiving an actuation command signal from an operator input device. In some cases, this actuation command signal can be of a finite time width (e.g., acquired for a period of time), while in other cases, the actuation signal can be continuously inputted (e.g., as long as the power machine is turned on and operating). In some cases, the actuation command signal can be provided by a pedal, a joystick, or another operator input device that may be susceptible to unwanted input at particular frequencies (e.g., at a natural frequency of a power machine, via vibrations transmitted via an operator to the input device). As noted above, some embodiments may be particularly useful for control of unwanted oscillations of an input pedal, particularly relative to commanded shaking of an implement. However, the principles disclosed herein can generally also be applied to other input devices and work operations.

At block 358, the process 350 can include the one or more computing devices filtering the actuation command signal using the notch (or other) filter (e.g., as constructed at block 354 of the process 350) to generate a filtered actuation command signal. In some cases, the notch filter can be a time domain filter, or a frequency domain filter. For example, with the notch filter being a time domain filter, the actuation signal in the time domain can be convolved with the time domain notch filter to generate a filtered actuation signal. Alternatively, when the notch filter is a frequency domain filter, the actuation signal in the time domain can be transformed into the frequency domain (e.g., using the discrete Fourier transform ("DFT")), and multiplied with the frequency domain notch filter to generate a filtered frequency based actuation signal. Then, the one or more computing devices can transform the filtered frequency based actuation signal to generate a filtered actuation command signal.

At block 360, the process 350 can include the one or more computing devices controlling an actuation of a work element of the power machine, based on the filtered actuation signal. For example, in some cases, the filtered actuation signal can be further passed through an input handling system (e.g., the input handling system 314 of the control device 304) that further modulates the signal for control of a relevant actuator.

As also noted above, although the notch filter of the process 350 can be configured to attenuate signals within a stop band, in other configurations, the process 350 can include adjusting the gain of the notch (or other) filter so that some frequency bands have a gain that is greater than one (e.g., amplifying signals within one or more frequency bands). For example, for some frequencies that an operator typically uses to shake an implement (e.g., approximately 2 Hz), the frequency response of a notch filter can be greater than one. In some configurations, rather than modifying a notch filter for amplification of signals, the actuation signals within a desired frequency range (e.g., 2-4 Hz) can be amplified by using other generally known approaches (e.g., a digital amplifier, an electrical amplifier, etc.). In some embodiments, such amplification can occur after filtering with a notch filter and before processing by an input handling (e.g., kinetic control) system.

Figure 9:
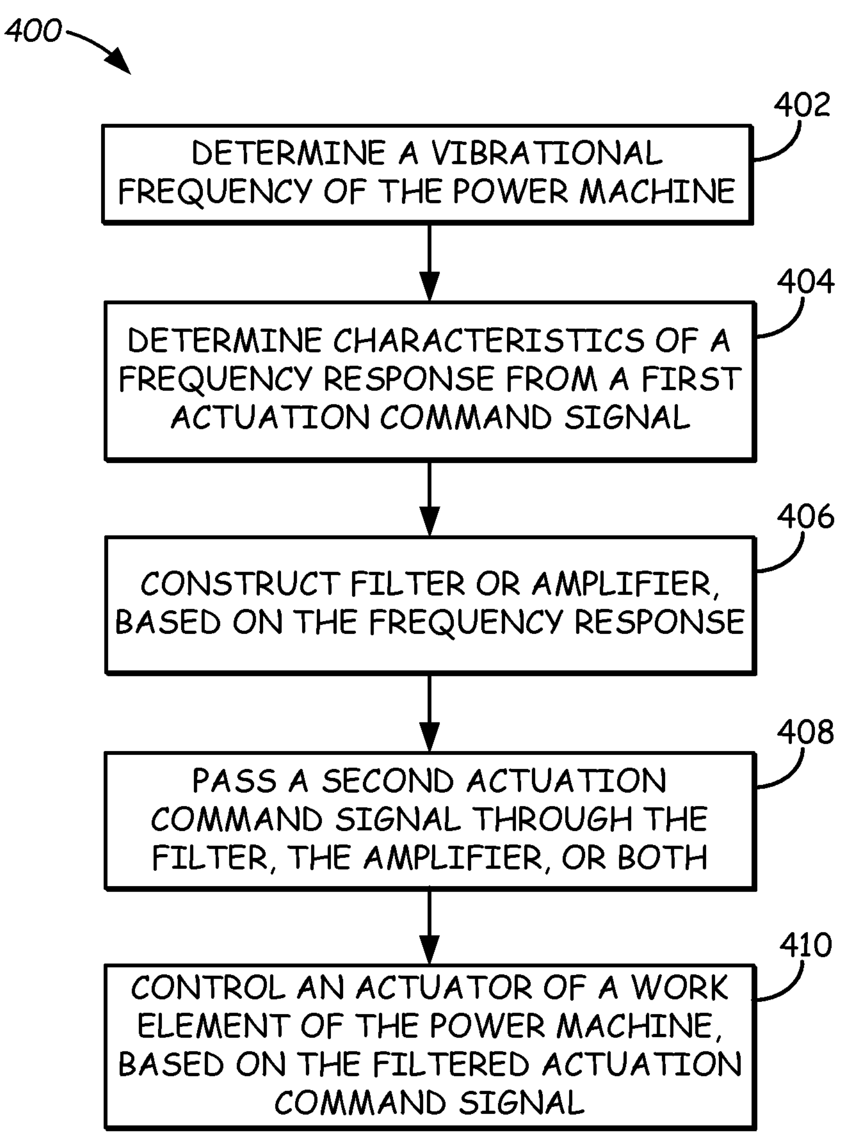
FIG. 9 is a flowchart of a process of controlling an actuator of a power machine.

FIG. 9 shows a flowchart of a process 400 of controlling an actuator of a power machine, which can include controlling movement of a work element of a power machine. The process 400 can be implemented using one or more computing devices (e.g., the control device 304). In addition, the process 400 can be implemented using any of the power machines described herein, including, for example, a loader (e.g., a skid-steer loader), an excavator, etc.

At block 402, the process 400 can include a computing device determining a vibrational frequency of a power machine, which can be similar to the block 352 of the process 350. For example, operations at block 402 can include a computing device receiving a vibration signal (e.g., from a vibration sensor coupled to the power machine), and determining the vibrational frequency of the power machine, which can be a resonant vibrational frequency of the power machine. In particular, among other approaches, a computing device can identify a peak in the frequency spectrum of the vibration signal to determine the vibrational frequency of the power machine (e.g., the resonant vibrational frequency). Alternatively, determining a vibrational frequency of a power machine can be predetermined using data collected in machine vehicle testing.

At block 404, the process 400 can include a computing device determining one or more characteristics of frequency response from a first actuation command signal. For example, a command signal can include one or more first actuation command signals, such as may result from a frequency sweep across a desired frequency band. In particular, the frequency response can be generated using a plurality of first actuation command signals, each including different frequency components (e.g., with differing amplitudes) across a desired frequency range (e.g., the maximum possible frequency range that an actuator can reciprocally move at, such as 0-20 Hz). In some configurations, the first actuation command signal can be received from the operator input device, and the frequency response can be the result of passing the operator input device through relevant modules of the control system (e.g., the input handling system that acts as a low-pass filter, a digital filter that corresponds with the response of the input handling system, or other constructs of the relevant system(s)).

In some cases, one or more characteristics of a frequency response from a first actuation signal can include a corner frequency or a roll-off. Thus, in some cases, operations at block 404 can include determining a corner frequency or the magnitude of the roll-off of the frequency response (e.g., beyond the determined corner frequency). For example, magnitude of a roll-off can be determined as the negative slope of the roll-off (e.g., as a local or an average slope), which can be indicative of the order of the response with higher orders having steeper slopes and vice versa. In some configurations, these characteristics (or others determined at block 404) can be helpful in the construction of a filter, an amplifier, or both.

At block 406, the process 400 can include a computing device constructing a filter, an amplifier, or both (e.g., based on the first actuation command signal, the one or more characteristics of the actuation command signal, etc.). In some cases, this can include determining a frequency response for the filter, the amplifier, or both. For example, the filter constructed at block 406 can be a band-stop filter (e.g., a notch filter) with a stop band that overlaps with the vibrational frequency (e.g., determined at the block 402). In particular, the center frequency of the stop band of the band-stop filter can sometimes be substantially equal to or be otherwise aligned with the vibrational frequency (e.g., the resonant vibrational frequency). In some cases, the width of the stop band can be configured to span a frequency range that is less than the corner frequency of frequency response of the first actuation command signal. In other words, the stop band of the filter can be constructed at block 406 so as to not extend past the corner frequency of frequency response from the first actuation command signal. In this way, for example, the stop band does not undesirably attenuate frequencies that are higher than the resonant frequency of the power machine (e.g., higher frequencies as intentionally commanded by the operator, via the operator input device).

In some embodiments, the block 406 can include a computing device constructing an amplifier. As described above, for example, frequency responses for command signals can exhibit a natural roll-off at higher frequencies (e.g., substantially greater than 6 Hz), which can lead to a decrease of the magnitude of oscillations of an actuator. In other words, an operator can oscillate the operator input device at a higher frequency (e.g., 7 Hz) with a commanded amplitude at the higher frequency, but due to the attenuation by the input handling system, the commanded amplitude is attenuated by the roll-off, thus resulting in the actuator reciprocally moving (e.g., oscillating) at an amplitude that is less than (e.g., substantially less than) the commanded amplitude. Thus, a computing device can sometimes usefully construct an amplifier at block 406 to be applied at least to higher frequency values to advantageously offset attenuation losses from the input handling system.

In some cases, a computing device can construct an amplifier using the cut-off frequency of the frequency response from the first actuation command signal (e.g., determined at the block 404). For example, a corner frequency (e.g., a lower corner frequency) of the amplifier can be at substantially the same frequency as the location of the intersection between the roll-off of the frequency response from the first actuation command signal and the x-axis (e.g., the gain axis), which can be the only intersection of the frequency response with the x-axis. Correspondingly, the cut-off frequency of the roll-off of the frequency response from the first actuation command signal can be at a frequency that is substantially equidistant to: (a) the frequency at the intersection between the positive slope portion of the amplifier and the x-axis (e.g., the gain axis), and (b) the frequency at the intersection between the roll-off of the frequency response from the first actuation command signal and the x-axis (e.g., the gain axis). This configuration can effectively offset attenuation losses from the input handling system in some cases. In other cases, however, the amplifier can be constructed differently including with a different magnitude of the positive slope portion as compared with the negative slope portion of the low pass filter (e.g., corresponding with the input handling system), with the positive slope portion of the amplifier having a different intersection point with the x-axis, etc.

In some cases, the corner frequency of the frequency response from the first actuation command signal can intersect with a positive slope portion of the amplifier. In some configurations, a portion of (or the entire) frequency band of the negative slope roll-off of the frequency response from the first actuation command signal (e.g., a first frequency band) can overlap with a portion of the frequency band (e.g., a second frequency band) of the positive slope portion of the amplifier (e.g., with the second frequency band being larger than the first frequency band). In some cases, the order of the roll-off (e.g., from the first actuation command signal) can be the same as the order of amplifier. In other words, the roll-off can have the same number of poles as the amplifier. In this way, the amplifier can effectively offset losses at higher frequencies (e.g., without over or under amplifying). For example, the amplifier can match well with the inherent low pass filter (e.g., as seen in the frequency response from the first actuation command signal, which can be from an input handling system) so that the operator actuation does not deviate substantially from the actual actuation of the actuator. In other words, the amplifier can be configured to offset the roll-off so that signals past the cut-off frequency return to their unattenuated levels. In some cases, the first frequency band of the roll-off portion can be between about 5.5 Hz and about 9.5 Hz.

Figure 10:
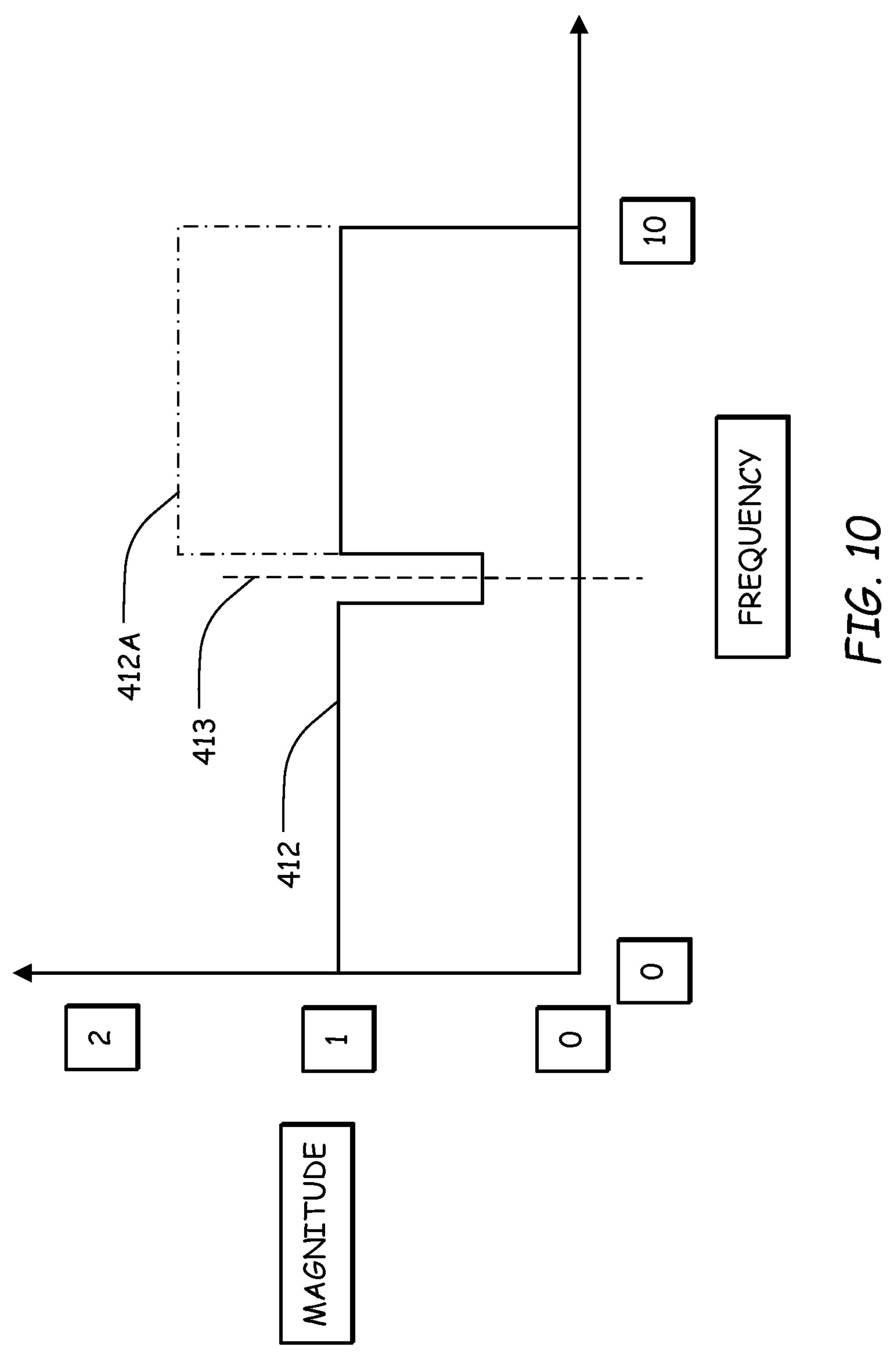
FIG. 10 shows a frequency response of a band-stop filter.

FIG. 10 shows a frequency response 412 of a band-stop filter, of the type that can be (e.g., a digital band-stop filter) constructed at the block 406. As shown in FIG. 10, the band-stop filter includes a stop band that overlaps with a resonant vibrational frequency 413 of a particular power machine as may be determined in real time or alternatively pre-determined after assessing one or more examples of a given type of power machine. In other cases, a stop band of a band-stop filter can be otherwise oriented (e.g., to overlap with a resonant frequency of a different power machine).

Figure 11:
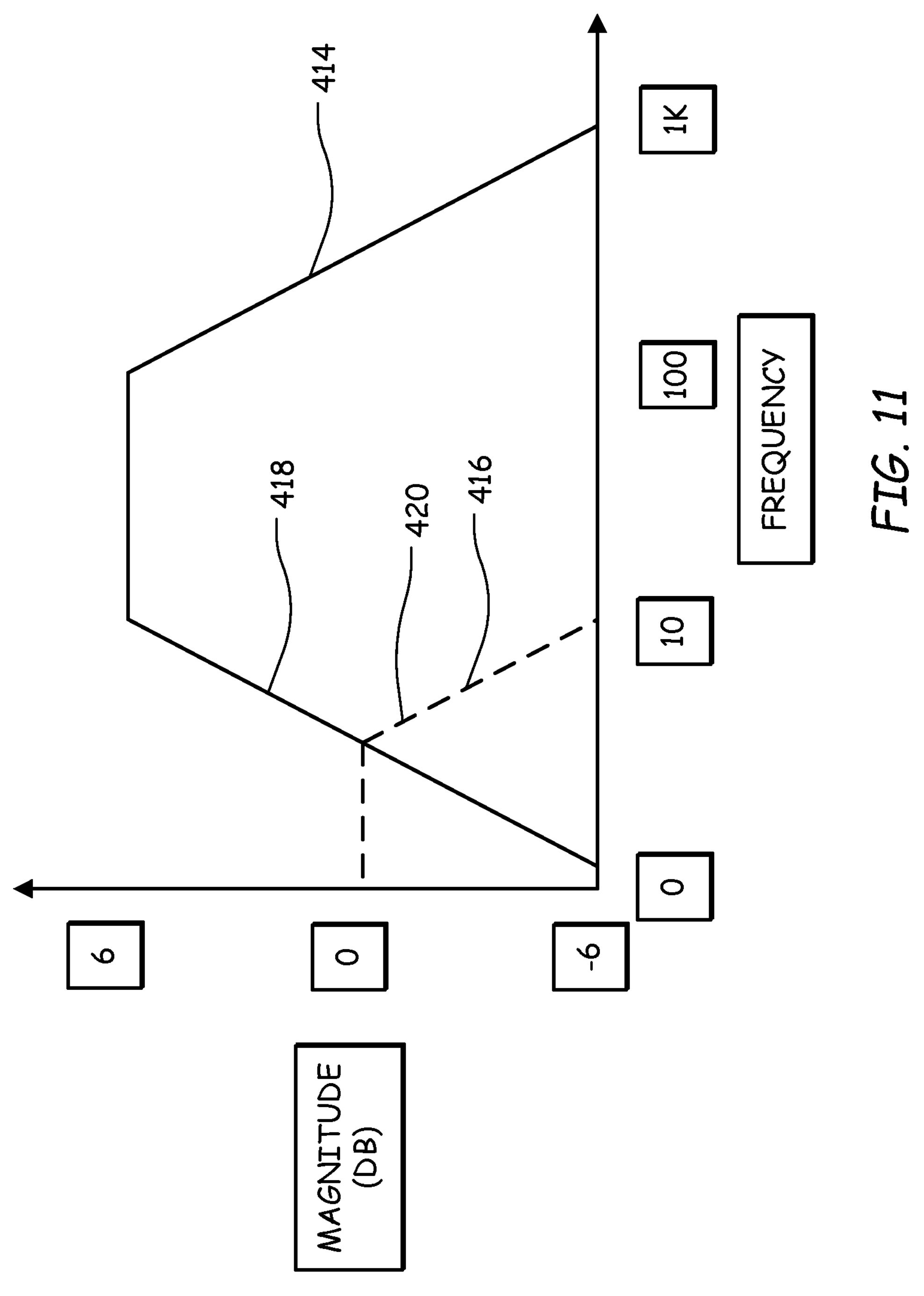
FIG. 11 shows a frequency response of an amplifier overlaid with a frequency response of a low pass filter.

FIG. 11 shows a frequency response 414 of an amplifier overlaid with a frequency response 416 that effectively includes a low pass filter (e.g., that is the resulting frequency response from an input handling system). As shown in FIG. 11, the upper region 418 of the positive slope portion of the frequency response 414 of the amplifier (e.g., greater than the cut-off frequency of the low pass filter) has the same magnitude slope as a roll-off region 420 of the negative slope portion of the frequency response 416 of the amplifier. In this way, when an actuation command signal having a largest frequency component greater than the corner frequency of the low pass filter (e.g., greater than 6 Hz) is amplified by the amplifier and subsequently passed through the input handling system (e.g., that acts as a low pass filter) or in a reverse order (e.g., being passed through the input handling system followed by amplification or other modifications to the driving signal(s) outputted therefrom), the resultant signal has reduced signal attenuation from the low pass filter. In other words, the amplifier can advantageously effectively offset signal attenuation by the input handling system.

In some configurations, although the notch filter has been described separately from the amplifier, aspects of both control strategies can be combined in some cases. For example, the notch filter can be selected to have a positive gain at certain frequency bands. For example, returning to FIG. 10, the stop band of the frequency response 412 of the band-stop filter can define a first frequency band, and the frequency response 412 of the band-stop filter can have a second frequency band different from the first frequency band (e.g., greater than the first frequency band, as shown at frequency response 412A) that has a gain greater than 1. In this way, the filter can also act as an amplifier for at least some frequency components—e.g., particularly the frequency components that are greater than the resonant frequency of the power machine or are otherwise susceptible to being undesirably attenuated by the input handling device. Thus, some representative band-stop filters can not only attenuate signals within a first frequency band but can also amplify signals within a second frequency band different than the first frequency band (e.g., greater than the first frequency band). Accordingly, the band-stop filter can thus also act as an amplifier.

Referring back to FIG. 9, at block 408, the process 400 can include a computing device passing a second actuation command signal through the filter, the amplifier, or both (e.g., as constructed at block 406). The second actuation command signal can be different or the same as the first actuation command signal. For example, the first actuation command signal can be a training signal for the construction of a filter, amplifier, etc., but can also be an actual command signal from the operator input device for a desired operation of the power machine. In this case, the first actuation command signal can be the same as the second actuation command signal. For example, the first actuation command signal can be used to determine frequency response characteristics at block 404 and to construct a filter or an amplifier at bock 406, then can be passed through the constructed filter or amplifier at block 408. As another example, the first actuation command signal can be a training signal only, used only for informing the construction of the filter, amplifier, etc., and subsequent signals can be processed by the constructed filter, amplifier, etc., accordingly. In this case, the second actuation signal can be different than the first actuation command signal.

In some embodiments, the actuation command signal can have an offset and one or more independent frequency components. In some cases, the offset can result in a drift of the actuator over time (e.g., a change over time in a reference position of the actuator about which the actuator reciprocally moves), while the one or more frequency components can result in reciprocating movement of an actuator at one or more relevant frequencies (e.g., about a reference position of the actuator, as may in turn be affected by the offset). This reciprocating movement of the actuator can drive rotational oscillation of a component (e.g., a work element) coupled to the actuator.

Figures 12, 13:
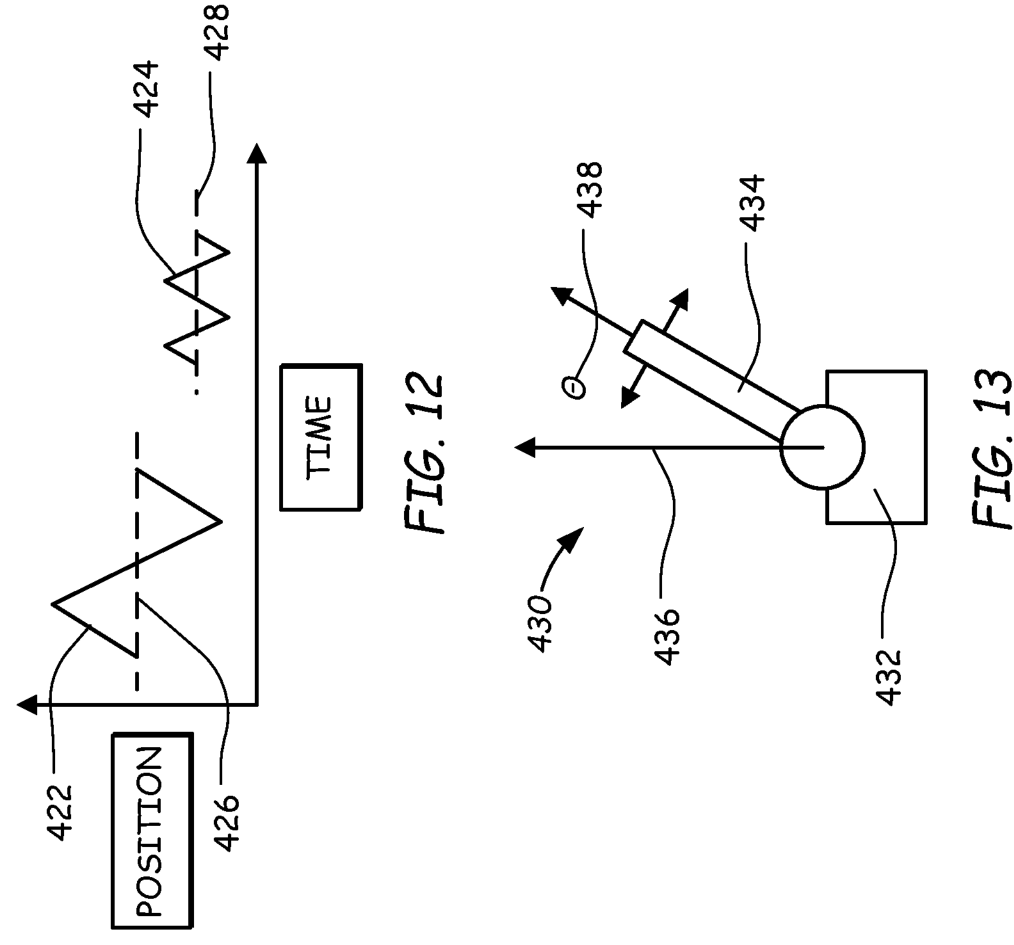
FIG. 12 is a graph of actuation command signals.
FIG. 13 is a schematic illustration of an operator input device.

FIG. 12 shows a graph of example actuation command signals 422, 424 (e.g., simplified for clarity relative to actual command signals), each of which can represent the position of an operator input device over time. As shown in FIG. 12, each actuation command signal 422, 424 can have a respective offset 426, 428 and a fundamental frequency (e.g., as indicated by the timing of the saw-tooth peaks). In some cases, and as illustrated, the offset 426 can be larger than the offset 428, and the fundamental frequency of the actuation command signal 422 can be lower than the fundamental frequency of the actuation command signal 424. (However, other permutations are possible, including higher frequencies at higher offsets). Each offset 426, 428 can be the DC offset, and can correspond to a reference position of the actuator input device about which the actuator input device is moved back and forth. Correspondingly, the fundamental frequency (or other frequency component, such as a larger/largest magnitude frequency component) can indicate the frequency the actuator is desired to be reciprocated at, and the magnitude of the fundamental frequency (or other frequency) can indicate the desired amount of reciprocal motion of the actuator (e.g., with the magnitude of the fundamental frequency being proportional to the amount of actual reciprocal movement of the actuator). In some cases, the actuation command signals 422, 424 can be filtered, attenuated, amplified, etc., including by a notch filter or an amplifier (e.g., as described above), to generate different command curves. Actuator command signals dictated by those command curves can then be provided to an actuator to cause the actuator to move accordingly.

FIG. 13 shows a schematic illustration of an operator input device 430, which can be a joystick 432 as illustrated. The joystick 432 can include an arm 434 pivotally coupled to a base of the joystick 432. As shown in FIG. 13, the joystick 432 is pivoted away from a home position of the arm 434 (e.g., in which the arm 434 in the home position aligns with a home axis 436) by an angle 438. The angle 438 corresponds to the offset, such as the offsets 426, 428 of FIG. 12. As noted above, this offset can be proportional to a reference position to which the actuator is commanded to move and then about which the actuator is commanded to reciprocate. As is also shown in FIG. 13, the arm 434 is moved forwards and backwards (or otherwise oscillated) about the angle 438, as indicated by the arrows perpendicular to a longitudinal axis of the arm 434 in FIG. 13. The frequency with which the arm 434 is oscillated corresponds to the frequency of the actuation command signal, and the amount the arm 434 is moved forwards and backwards corresponds to the amplitude of the actuation command signal. As described above, the frequency of the actuation command signal (or modified actuation command signal, or other signal generated that is based on the actuation command signal) can be substantially the same as the frequency of the reciprocation of the actuator, while the amplitude of the frequency of the actuation command signal can be proportional to the actual reciprocal movement of the actuator.

In some embodiments, a band-stop filter or an amplifier can have a gain at 0 Hz that is greater than or equal to 1. In some cases, referring back to FIGS. 10 and 11, the gain at 0 Hz (or about 0 Hz) can be about 1. In this way, for example, any commanded drift of the actuator (e.g., the DC value) as indicated by input at the operator input device may not be undesirably attenuated. In other words, the desired DC offset can be maintained in some embodiments, even after filtering, attenuating, amplifying, etc., other portions of an actuation command signal.

In some embodiments, and referring back to FIG. 9, the block 408 can include filtering at least a portion of the second actuation command signal, amplifying at least a portion of the second actuation command signal, and attenuating at least a portion of the second actuation command signal that can be different than a portion that is amplified or filtered.

Referring back to FIG. 9, at block 410, the process 400 can include a computing device controlling an actuator of a work element of a power machine based on the filtered or amplified command signal. Generally, therefore, operations at block 410 can include providing the filtered or amplified second actuation command signal to a power machine to move an actuator (e.g., of a work element) of the power machine (e.g., according to the filtered or amplified second actuation command signal). For example, the computing device can generate a driving signal using the filtered or amplified actuation command signal to be transmitted to a dedicated controller to command movement of an actuator. In particular, the computing device can generate the driving signal by providing the filtered or amplified second actuation command signal to an input handling system, which can output a driving signal. Thus, a computing device can generate the driving signal (e.g., from the input handling system) and can provide the driving signal to the actuator to move the actuator accordingly.

The second actuation command signal can define a frequency, an amplitude at the frequency, and an offset (e.g., a DC offset). In some cases, when the driving signal is provided to the actuator, the actuator can move to a reference position associated with the offset in the second actuation command signal (e.g., in which the actual offset of the actuator is proportional to the offset of the actuation command signal), and can reciprocate about the reference position at the frequency, and the amount of forwards and backwards reciprocal movement can be proportional to the amplitude of the second actuation command signal at the frequency.

In some configurations, the second actuation command signal can have multiple different frequency components, each of which can have different amplitudes. For example, the second actuation command signal can have a first frequency (e.g., 3 Hz) with a first amplitude (e.g., 1 magnitude), and a second frequency (e.g., 7 Hz) with a second amplitude (e.g., 0.5 magnitude). In some cases, when the second actuation command signal is used to generate a driving signal that is provided to the actuator, the actuator can reciprocally move according to each of the different frequencies. In other cases, a computing device can implement only select frequency components, such as the frequency component with the greater magnitude (e.g., a first frequency with a first amplitude).

Figure 14:
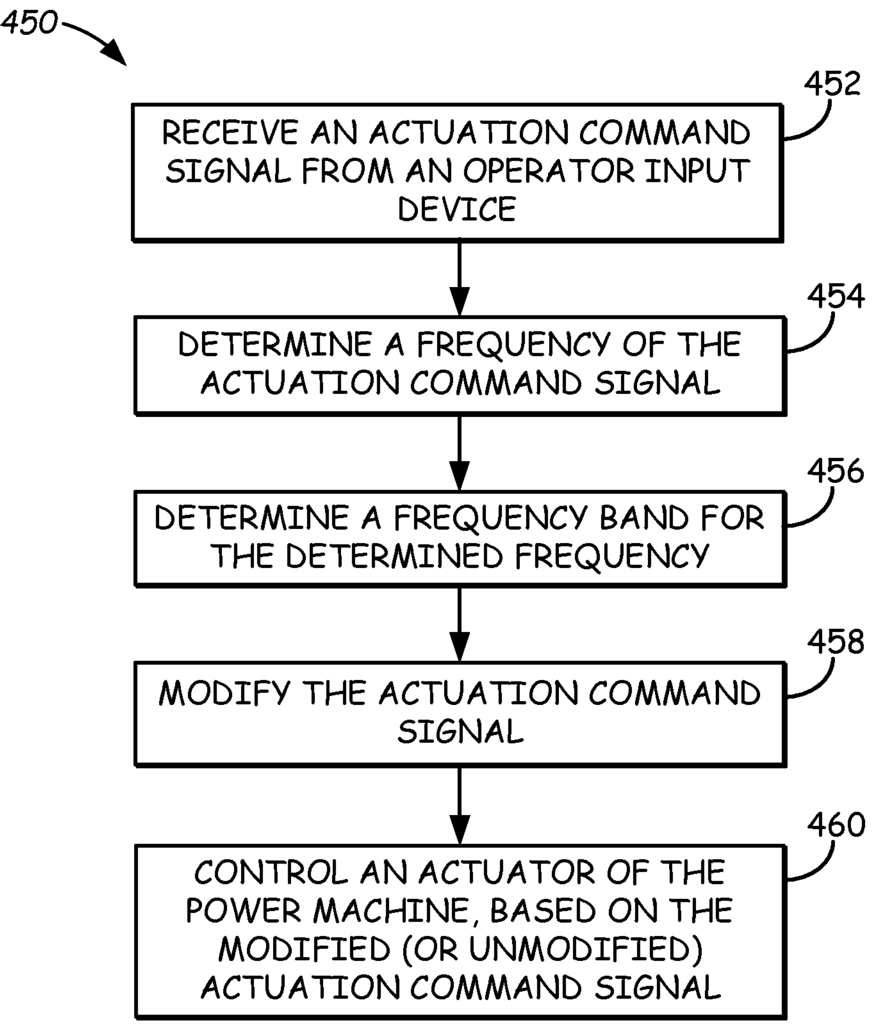
FIG. 14 is a flowchart of a process of controlling an actuator of a power machine.

FIG. 14 shows a flowchart of a process 450 of controlling an actuator of a power machine, which can include controlling movement of a work element of a power machine. The process 450 can be implemented using one or more computing devices (e.g., the control device 304). In addition, the process 450 can be implemented using any of the power machines described herein, including, for example, a loader (e.g., a skid-steer loader), an excavator, etc.

At block 452, the process 450 can include a computing device receiving an actuation command signal from an operator input device, which can be similar to the block 356 of the process 350. In some cases, the actuation command signal can include an offset (e.g., a DC offset) and at least one frequency with a respective amplitude at each frequency.

At block 454, the process 450 can include a computing device determining a frequency of the actuation command signal. In some cases, this can include a computing device identifying each frequency component in the actuation command signal that has a magnitude above a threshold value (e.g., 1.5 magnitude), which can be implemented by transforming a time-domain signal (e.g., the actuation command signal) into the frequency domain (e.g., using a discrete Fourier transform such as a fast Fourier transform). In this way, for example, a computing device does not inadvertently identify frequency components that may be contributed to noise. In some configurations, the computing device can determine the frequency of the actuation command signal (e.g., in which the actuation command signal has been transformed into a spectrum) that has the largest magnitude. In some embodiments, the frequency can be a single frequency (aside from the frequency at zero, or the DC offset) of the actuation command signal.

At block 456, the process 450 can include a computing device determining a frequency band for the determined frequency. In some cases, there can be multiple different frequency bands in which the determined frequency can fall under, each of which can be associated with a different process (e.g., a filtering scheme, no filtering scheme, etc.). In this way, the actuation command signal can be modified based on the frequency components therein, which can better improve the desired actuation response. In some cases, there can be four different frequency bands, which can include a first frequency band, a second frequency band, a third frequency band, and a fourth frequency band. The first, second, third, and fourth frequency bands can increase in the listed order. For example, the first frequency band can be less than the first, second, and third frequency bands, the second frequency band can be greater than the first frequency band and less than the third and fourth frequency bands, the third frequency band can be greater than the first and second frequency bands and less than fourth frequency band, and the fourth frequency band can be greater than the first, sound, and third frequency bands. In some cases, the first frequency band can be between about 0 Hz and about 5 Hz, the second frequency band can be between about 5 Hz and about 5.5 Hz, the third frequency band can be between about 5.5 Hz and 9.5 Hz, and the fourth frequency band can be greater than about 9.5 Hz (e.g., in which the upper limit can be 10 kHz, 20 kHz, 30 kHz, etc. These frequency bands are illustrative in nature. The actual frequency bands on a machine are dependent on the physical characteristics of the geometry of the machine and the responsive capability of certain actuators.

At block 458, the process 450 can include a computing device modifying the actuation command signal, based on the determined frequency band (e.g., at the block 456) or the determined frequency (e.g., at the block 454), which can include using the determined frequency band. As described above, each different frequency band can be associated with a different process, and thus a computing device can coordinate the appropriate conditioning of the signals based on the frequency components present in the actuation command signal. In other words, better signal conditioning can sometimes be realized using different signal conditioning processes, depending on the frequency components present in an actuation signal (or otherwise). In some embodiments, modifying the actuation signal can include filtering the actuation command signal (e.g., including attenuating a frequency component, amplifying a frequency component, etc.), attenuating at least a portion of the actuation command signal, and amplifying at least a portion of the actuation command signal.

In some embodiments, relatively low frequency components of an actuation command signal typically do not pose many undesirable characteristics. Thus, in some cases, if a computing device determines at the block 458 that the frequency is within the first frequency band, the computing device can cause the actuation command signal to pass through unimpeded, which can include avoiding filtering, attenuating, amplifying, etc., any of the frequency components of the actuation command signal other than from the actuation command signal passing through a baseline input handling system that acts as a filter (e.g., a low pass filter). In this way, for example, lower frequency components can be passed through without significant (and largely unneeded) modifications.

In some embodiments, undesirable vibrational resonant frequencies can be present within the second frequency band, which can be greater than the first frequency band. Thus, in some cases, if a computing device determines at the block 458, that the frequency is within the second frequency band, the computing device can cause the actuation command signal to be passed through the band-stop filter (e.g., the band-stop filter associated with FIG. 10), which can attenuate the large frequency component of the vibrational resonant frequency of the power machine (e.g., which can be presented within the second frequency band).

In some embodiments, frequency components at higher frequencies can be undesirably attenuated (e.g., from the input handling system). Thus, if a computing device determines at the block 458 that the frequency is within the third frequency band, the computing device can cause the actuation command signal to be passed through the amplifier (e.g., the amplifier associated with FIG. 11), which can advantageously amplify higher frequency signals that are attenuated by the input handling device of the power machine to compensate for the roll-off at higher frequencies. Accordingly, in some cases, the block 458 can include a computing device amplifying one or more frequency components of the actuation command signal that are within the third frequency band.

In some configurations, the computing device can pass the actuation command signal through the band-stop filter (e.g., first), and can pass the actuation command signal through the amplifier (e.g., second, after passing through the band-stop filter). This can ensure that any non-desirable components near the resonant frequency are removed by the band-stop filter, while also amplifying higher frequency components.

In some embodiments, high frequency components of the actuation command signal can either result in lower than desired magnitudes of reciprocal movement of an actuator. In other words, due to the attenuation by the input handling device, high frequency components can be attenuated, resulting in actual movements of the actuator that are less than what are commanded (e.g., according to the actuation command signal). In some cases, substantially high frequencies (e.g., 15 Hz) of the actuation command signal can result in little to no actual reciprocal movement of the actuator due to the attenuation by the input handling system. Thus, a computing device can cause the actuator to reciprocally move at a lower frequency than the frequency commanded by the actuation command signal, which can result in reciprocal movements of a magnitude that is closer to what is intended by the input. For example, if a computing device determines at the block 458 that the frequency is within the fourth frequency band (e.g., the frequency is greater than a threshold frequency, such as 9 Hz, 9.5 Hz, etc.), the computing device can modify the actuation command signal to have a lower frequency, the computing device can generate a second actuation command signal that has a lower frequency than the actuation command signal, or the computing device can otherwise cause the actuator to move at a lower frequency than the commanded frequency (e.g., by generating an appropriate driving signal provided to the actuator to move the actuator). In this way, the power machine can cause higher magnitude reciprocal movement or can cause actual movement of the actuator by decreasing the commanded oscillation frequency. In some embodiments, the actuator can have a maximum allowable frequency for reciprocal movement. In other words, commanded frequencies above the maximum allowable frequency lead to no actual movement of the actuator (e.g., because the DC motors that power the actuator cannot properly handle those higher frequencies). In some embodiments, the frequency (e.g., determined at the block 454) can be higher than the maximum allowable frequency of the actuator. In addition, including when the computing device determines that the frequency is larger than the maximum allowable frequency of the actuator, the computing device can cause the actuator to reciprocally move at the maximum allowable frequency (e.g., or about the maximum allowable frequency). In this way, the computing device can allow for actual movement of the actuator closest to the commanded frequency.

Figure 15:
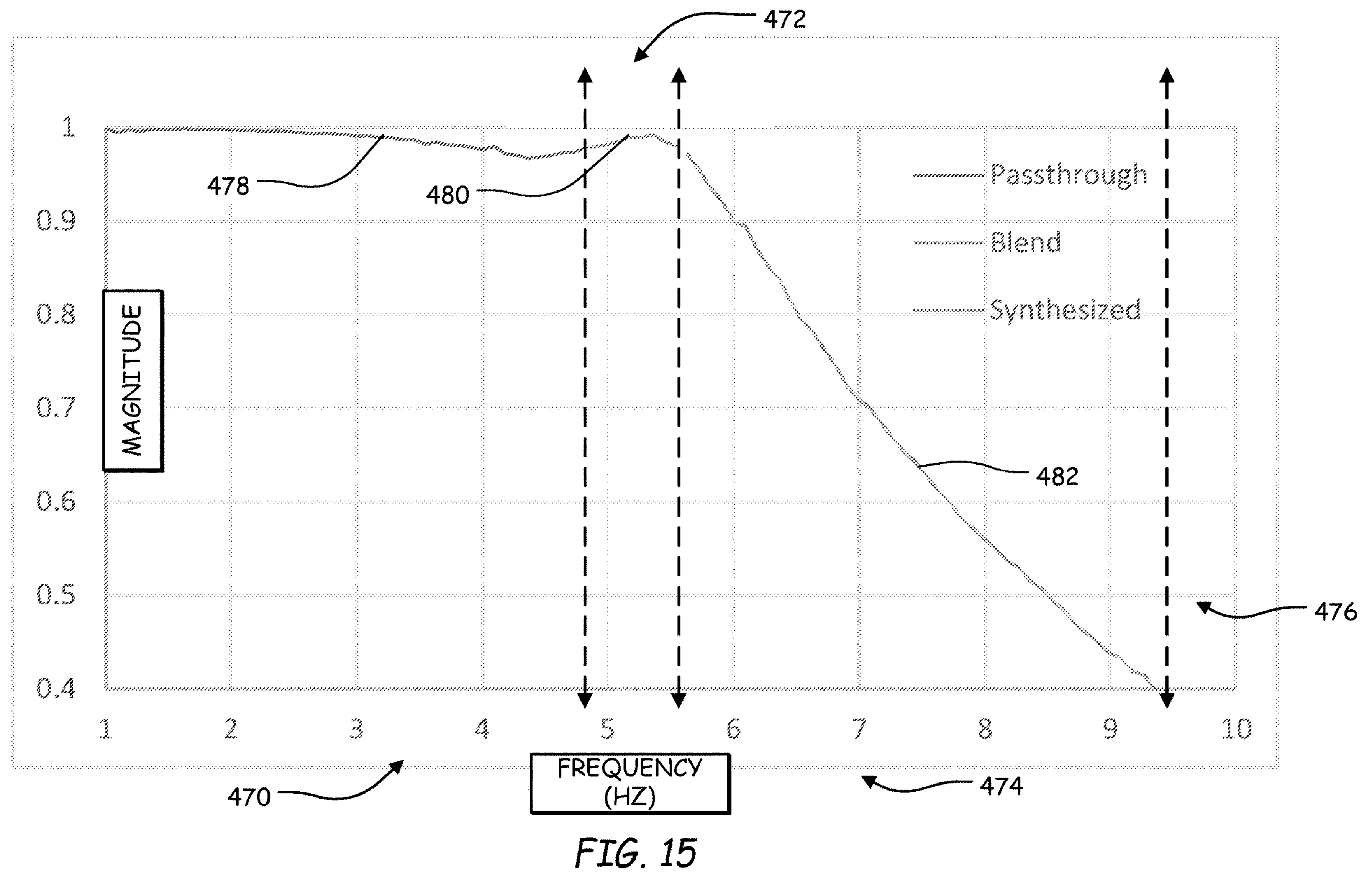
FIG. 15 is a graph of the frequency response of an actuation command signal for different frequency bands.

FIG. 15 shows a graph of the frequency response of an actuation command signal for different frequency bands. As shown in FIG. 15, there are frequency bands 470, 472, 474, 476 in increasing order (i.e., from lowest to highest maximum frequencies). For example, the frequency band 470 can be between about 0 Hz and about 4.9 Hz, the frequency band 472 can be between about 4.9 Hz and about 5.5 Hz, the frequency band 474 can be between about 5.5 Hz and about 9.5, and the frequency band 476 can be greater than 9.5 Hz. In some embodiments, a portion 478 of the actuation command signal can be restricted to between 0 Hz and 4.9 Hz and can be passed through the input handling system, a portion 480 of the actuation command signal can be restricted to between 4.9 Hz and 5.5 Hz and can be passed through a notch filter before being passed through the input handling system, and a portion 482 of the actuation command signal can be restricted to between 5.5 Hz and 8.5 Hz and can be passed through an amplifier before being passed through the input handling system. As shown in FIG. 15, frequencies beyond about 9.5 Hz are significantly attenuated. The attenuation within the frequency band 476 can lead to an amount of reciprocal movement that is insufficient to properly shake the bucket (e.g., to remove dirt from the bucket). In some cases, as described above, commanded frequencies within the fourth frequency band can be too high for any actual reciprocal movement of the actuator. In other words, the actuator cannot physically respond to commanded frequencies beyond a certain level within the frequency band 476.

Figure 16:
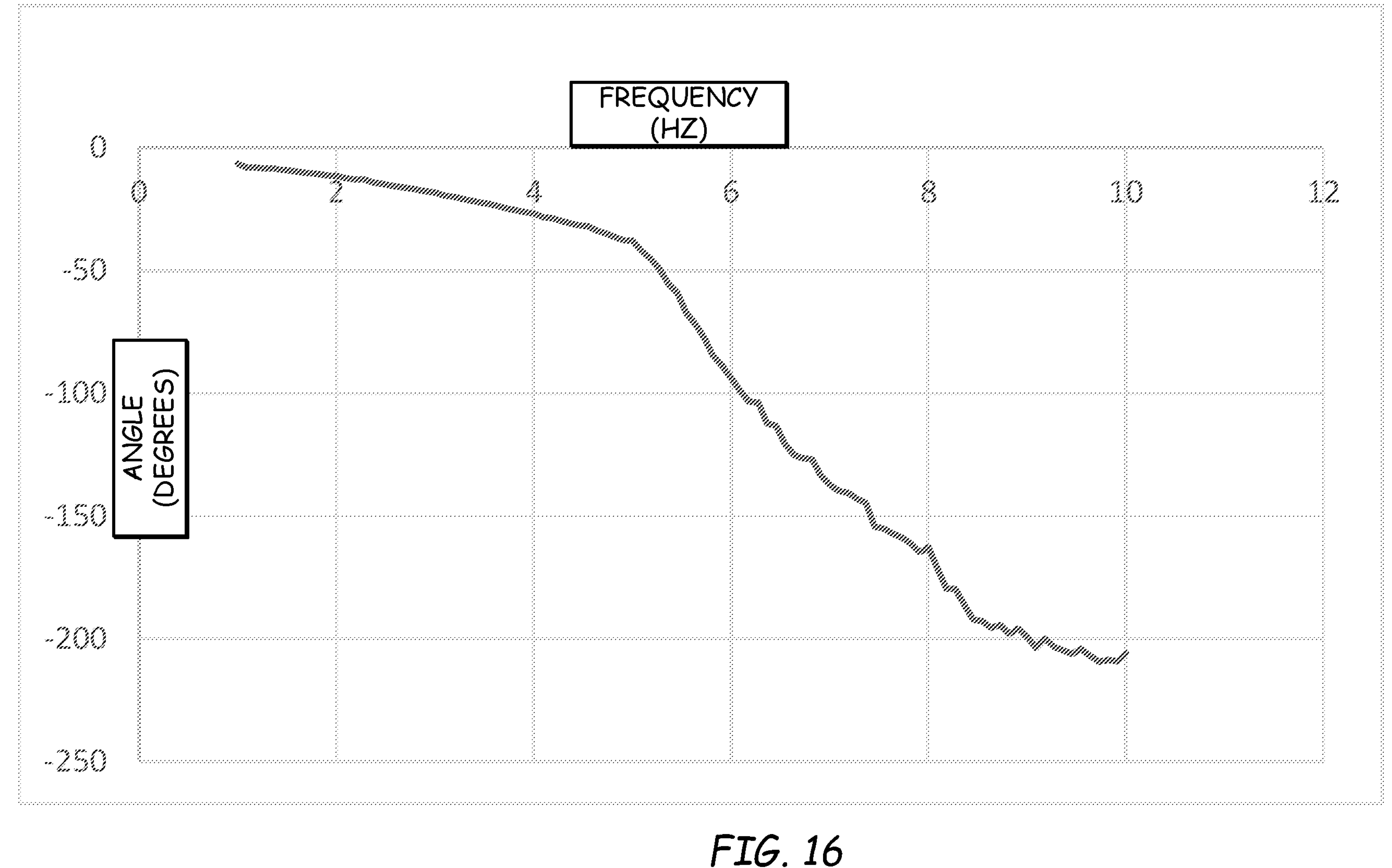
FIG. 16 is a graph of the phase response for the actuation command signal of FIG. 15.

FIG. 16 shows a graph of the phase response for the actuation command signal of FIG. 15. As shown in FIG. 16, because the phase decreases and the magnitude correspondingly decreases with the decreasing phase (e.g., with the decreasing magnitude shown in FIG. 15), with increasing frequencies, the larger phase shift (e.g., less than or equal to −180 degrees) is unlikely to cause undesired behavior (e.g., unintended oscillation of the actuator). Therefore, modified actuation command signals, for example, by filtering with a band-stop filter, amplifying with an amplifier, etc., provides improved magnitude modifications while providing a stable response.

Referring back to FIG. 14, at block 460, the process 450 can include a computing device controlling an actuator (e.g., of a work element) of a power machine, based on the modified (or unmodified) actuation command signal. In some cases, the block 460 can be similar to block 360 of the process 350. For example, a computing device can generate a driving signal using the actuation command signal. In particular, a computing device can generate the driving signal by inputting the actuation command signal into the input handling system (e.g., a hardware module, a software module, or both of the computing device), which can output the driving signal. Once generated, the computing device can then provide the driving signal to the actuator to cause the actuator to move accordingly. In some cases, this process of using the actuation command signal and the input handling system can be desirable for frequencies less than a threshold value (e.g., 9.5 Hz) including those within the first, second, and third frequency bands.

In some embodiments, the block 460 can include a computing device maintaining an offset of the actuator, based on the offset of the actuation command signal (e.g., from the block 458). For example, a computing device can ensure that the DC offset (e.g., the 0 Hz component) of the actuation command signal is not modified (e.g., attenuated, amplified, etc.), which could undesirably change the desired commanded offset of the actuator.

Thus, some embodiments of the disclosure can provide improved control of work elements, including for commanded oscillating movement of actuators. In some cases, by filtering actuation command signals within a particular frequency band, system response to operator input can be significantly improved. For example, filtering of an actuation command signal with a notch filter can help to remove components of the actuation command signal that may result from inadvertent operator movement, including as driven by natural frequency vibrations of a power machine. Further, with appropriate gain and other settings, while unwanted frequency inputs may be reduced, desired oscillating operation of an actuator may still be readily achieved, including at frequencies within the frequency band of the relevant filter. The overall result is improved oscillation of an actuator (such as is needed to shake dirt from a bucket) in response to commands from an operator that may be less than ideal to control the physical system on the machine.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of" "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of," or "exactly one of."

Also as used herein, unless otherwise specified or limited, the terms "about" and "approximately," as used herein with respect to a reference value, refer to variations from the reference value of ±15% or less (e.g., ±10%, ±5%, etc.), inclusive of the endpoints of the range. Similarly, the term "substantially equal" (and the like) as used herein with respect to a reference value refers to variations from the reference value of less than ±30% (e.g., ±20%, ±10%, ±5%) inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

Although the present invention has been described by referring to preferred embodiments, workers skilled in the art will recognize that changes may be made in form and detail without departing from the scope of the discussion.

What is claimed is:

1. A power machine comprising:

a main frame;

a work element supported by the main frame, the work element comprising:

a lift arm moveably secured to the main frame;

an implement carrier movably secured to the lift arm;

an implement secured to the implement carrier;

an actuator that is actuatable to move one of: the implement with respect to the lift arm or the lift arm with respect to the main frame;

an operator input device that is configured to transmit actuation command signals based on operator input that directly commands movement of the work element, to control the actuator of the work element to cause movement that corresponds with the commanded movement;

a control system that includes a control device in communication with the operator input device and the actuator, the control device being configured to:

receive, from the operator input device, an actuation command signal that commands movement of the implement, wherein the actuation command signal is based on a physical movement of the operator input device, wherein vibration of the power machine during operation induces a portion of the physical movement of the operator input device, and wherein the actuation command signal includes a vibrational component corresponding to the portion of the physical movement induced by the vibration of the power machine;

filter the actuation command signal, using a band-stop filter, to generate a filtered actuation command signal that excludes at least a portion of the actuation command signal received from the operator input device; and control movement of the implement, via the actuator, based on the filtered actuation command signal.

2. The power machine of claim 1, wherein the control device is further configured to:

filter the actuation command signal, using the band-stop filter, to attenuate a vibrational resonant frequency component of the power machine.

3. The power machine of claim 2, wherein the band-stop filter has a stop band with a non-zero gain.

4. The power machine of claim 3, wherein the non-zero gain is greater than or equal to 0.5.

5. The power machine of claim 1, wherein the control device is further configured to amplify at least one frequency component of the actuation command signal or the filtered actuation command signal to generate an amplified actuation command signal.

6. The power machine of claim 5, wherein the at least one frequency component is greater than a threshold frequency; and wherein the threshold frequency is greater than a vibrational resonant frequency of the power machine.

7. The power machine of claim 5, wherein the at least one frequency component is greater than at least 5.5 Hz.

8. The power machine of claim 1, wherein the actuator is one of: a tilt actuator that is coupled to the implement to adjust an attitude of the implement relative to the lift arm, or a lift actuator that is coupled to the lift arm to adjust the lift arm relative to the main frame.

9. The power machine of claim 1, wherein the operator input device includes at least one of a pedal, a joystick mounted in the power machine, an actuatable input device on a remote control, or a personal computing device.

10. A computer-implemented method for controlling movement of a work element of a power machine, the method comprising:

receiving, from an operator input device, an actuation command signal for commanded movement of an actuator of the work element, wherein the actuation command signal is based on a physical movement of the operator input device, wherein vibration from operation of the power machine induces at least a portion of the physical movement of the operator input device;

filtering the actuation command signal to generate a filtered actuation command signal, wherein filtering the actuation command signal attenuates a frequency component of the actuation command signal that corresponds to a vibrational resonant frequency of the power machine; and causing the actuator of the work element to move based on the filtered actuation command signal.

11. The method of claim 10, further comprising determining a frequency of the actuation command signal; and wherein filtering the actuation command signal is based on the determined frequency of the actuation command signal.

12. The method of claim 11, wherein filtering the actuation command signal avoids attenuating a frequency component of the actuation command signal that is 0 Hz.

13. The method of claim 10, further comprising:

amplifying at least one frequency component of the actuation command signal or the filtered actuation command signal to generate an amplified actuation command signal.

14. The method of claim 13, further comprising determining a frequency of the actuation command signal; and wherein amplifying the actuation command signal is based on the determined frequency of the actuation command signal.

15. The method of claim 13, wherein the at least one frequency component of the actuation command signal that is amplified is greater than a cutoff frequency of a frequency response of an input handling system in which actuation command signals are provided thereto to move the actuator.

16. The method of claim 10, wherein the actuation command signal includes a first frequency; and wherein the actuator of the work element is caused to move at a second frequency that is less than the first frequency.

17. A power machine comprising:

a main frame;

a work element supported by the main frame, the work element comprising:

a lift arm moveably secured to the main frame;

an implement carrier movably secured to the lift arm; and an actuator that is configured to move the implement carrier with respect to the lift arm, or the lift arm with respect to the main frame;

an operator input device that is configured to transmit actuation command signals based on operator input that commands movement of the implement carrier, to control the actuator of the work element to cause movement of the implement carrier that corresponds to the commanded movement;

a control system that includes a control device in communication with the operator input device and the actuator, the control device being configured to:

in response to movement of the operator input device by an operator, receive, from the operator input device, an actuation command signal that commands movement of the actuator, wherein a portion of the movement of the operator input device is induced by operational vibration of the power machine, and wherein the actuation command signal includes a vibrational component corresponding to the portion of the movement; and control the actuator for movement of the implement carrier based on the movement of the operator input device by the operator, including, for a first frequency range of the actuation command signal, filtering the actuation command signal using a band-stop filter to generate a filtered actuation command signal that excludes at least a portion of the actuation command signal received from the operator input device.

18. The power machine of claim 17, wherein the control device is configured to control the actuator for movement of the implement carrier based further on:

for a second frequency range of the actuation command signal below the first frequency range, not attenuating or amplifying a magnitude of a frequency of the actuation command signal.

19. The power machine of claim 17, wherein the control device is configured to control the actuator for movement of the implement carrier based further on:

for a third frequency range of the actuation command signal, amplifying the actuation command signal to generate an amplified actuation command signal.

20. The power machine of claim 17, wherein the control device is configured to control the actuator for movement of the implement carrier based further on:

for a fourth frequency range of the actuation command signal, causing the actuator to reciprocally move at a reduced frequency as compared to the actuation command signal.

21. The power machine of claim 17, wherein the first frequency range includes a vibrational resonant frequency of the power machine.

22. The power machine of claim 17, wherein the actuator is a tilt actuator configured to change an attitude of the implement carrier relative to the lift arm.

23. The power machine of claim 17, wherein the actuator is a direct current (DC) actuator.

* * * * *